United States Patent
Nomura

(10) Patent No.: US 8,284,227 B2
(45) Date of Patent: Oct. 9, 2012

(54) IMAGE FORMING APPARATUS AND IMAGE FORMING METHOD

(75) Inventor: Yoshihisa Nomura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 172 days.

(21) Appl. No.: 12/938,186

(22) Filed: Nov. 2, 2010

(65) Prior Publication Data
US 2011/0122216 A1    May 26, 2011

(30) Foreign Application Priority Data

Nov. 20, 2009  (JP) ................. 2009-265348

(51) Int. Cl.
*B41J 2/435* (2006.01)
*B41J 2/47* (2006.01)

(52) U.S. Cl. .............. 347/234; 347/229; 347/248

(58) Field of Classification Search ............ 347/229, 347/234, 235, 248–250
See application file for complete search history.

(56) References Cited

U.S. PATENT DOCUMENTS

| 5,461,412 A * | 10/1995 | Paoli et al. ............ 347/243 |
| 7,598,973 B2 * | 10/2009 | Tsujino et al. ............ 347/238 |
| 7,630,100 B2 * | 12/2009 | Tojima et al. ............ 358/3.26 |
| 8,189,245 B2 * | 5/2012 | Soda ............ 358/518 |

FOREIGN PATENT DOCUMENTS

JP  2004-170755  6/2004

* cited by examiner

*Primary Examiner* — Hai C Pham
(74) *Attorney, Agent, or Firm* — Fitzpatrick, Cella, Harper & Scinto

(57) ABSTRACT

In a printing device provided with a multi-laser beam, an image gradation occurs due to a difference in characteristics between respective beams. The output beam number is changed by referring to a profile (curvature, tilt, polarity and beam scan interval) of each laser beam to perform a print at an engine rotation speed corresponding to the beam number.

6 Claims, 23 Drawing Sheets

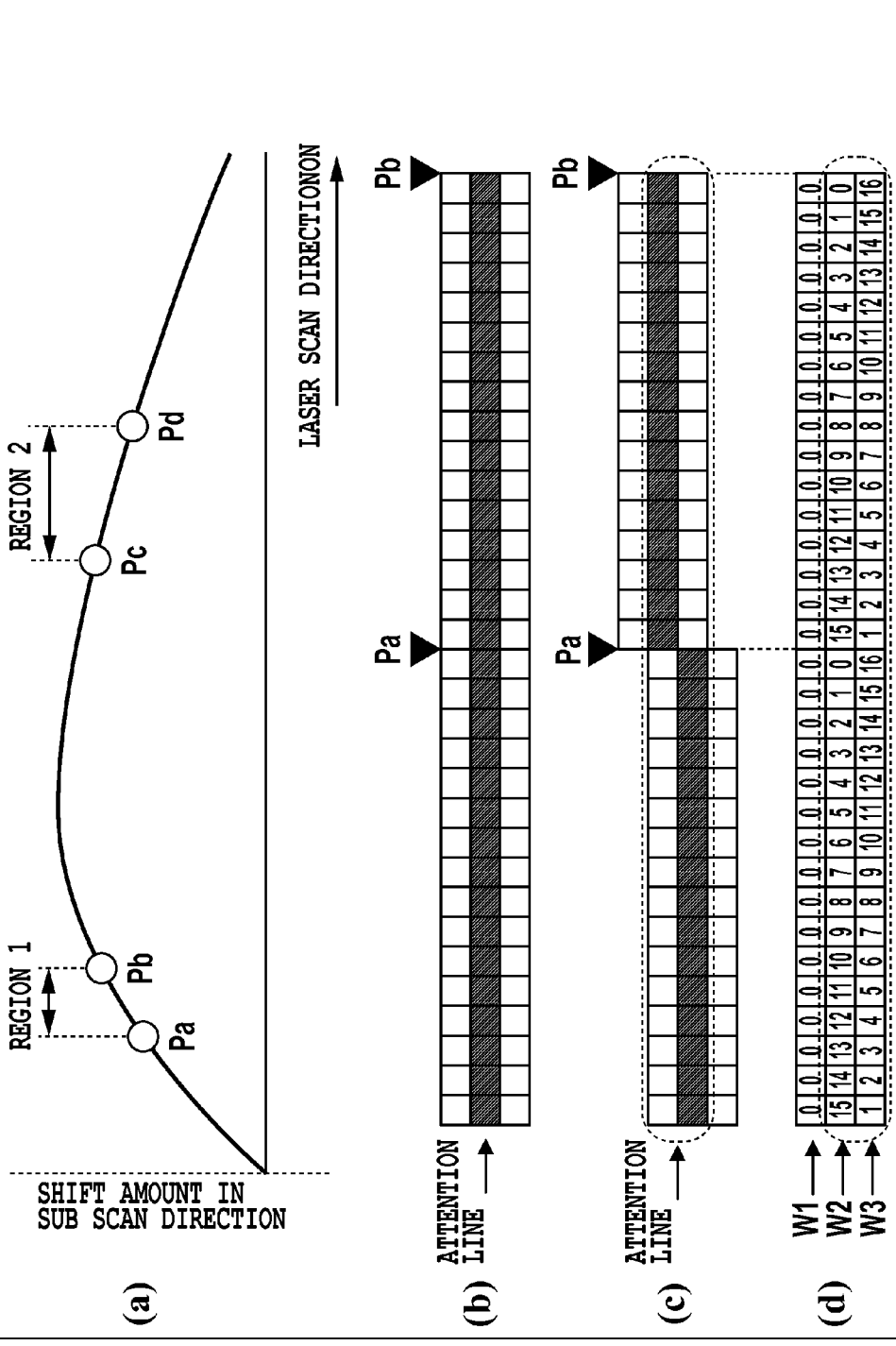

DIRECTION:UPWARD SHIFT

NUMBER OF INTERPOLATION OBJECT PIXEL:16

| W1 → | 0 | 0 | 0 | 0 | 0 | 0 | 0 | 0 | 0 | 0 | 0 | 0 | 0 | 0 | 0 | 0 |
| W2 → | 33 | 31 | 29 | 27 | 25 | 23 | 21 | 19 | 17 | 15 | 13 | 11 | 9 | 7 | 5 | 3 |
| W3 → | 3 | 5 | 7 | 9 | 11 | 13 | 15 | 17 | 19 | 21 | 23 | 25 | 27 | 29 | 31 | 33 |

FIG.6A

NUMBER OF INTERPOLATION OBJECT PIXEL:16

| W1 → | 0 | 0 | 0 | 0 | 0 | 0 | 0 | 0 | 0 | 0 | 0 | 0 | 0 | 0 | 0 | 0 |
| W2 → | 9 | 9 | 8 | 8 | 7 | 7 | 6 | 5 | 5 | 4 | 3 | 3 | 2 | 2 | 1 | 1 |
| W3 → | 1 | 1 | 2 | 2 | 3 | 3 | 4 | 5 | 5 | 6 | 7 | 7 | 8 | 8 | 9 | 9 |

FIG.6B

DIRECTION:DOWNWARD SHIFT

NUMBER OF INTERPOLATION OBJECT PIXEL:16

| W1 → | 3 | 5 | 7 | 9 | 11 | 13 | 15 | 17 | 19 | 21 | 23 | 25 | 27 | 29 | 31 | 33 |
| W2 → | 33 | 31 | 29 | 27 | 25 | 23 | 21 | 19 | 17 | 15 | 13 | 11 | 9 | 7 | 5 | 3 |
| W3 → | 0 | 0 | 0 | 0 | 0 | 0 | 0 | 0 | 0 | 0 | 0 | 0 | 0 | 0 | 0 | 0 |

FIG.6C

NUMBER OF INTERPOLATION OBJECT PIXEL:16

| W1 → | 1 | 1 | 2 | 2 | 3 | 3 | 4 | 5 | 5 | 6 | 7 | 7 | 8 | 8 | 9 | 9 |
| W2 → | 9 | 9 | 8 | 8 | 7 | 7 | 6 | 5 | 5 | 4 | 3 | 3 | 2 | 2 | 1 | 1 |
| W3 → | 0 | 0 | 0 | 0 | 0 | 0 | 0 | 0 | 0 | 0 | 0 | 0 | 0 | 0 | 0 | 0 |

FIG.6D

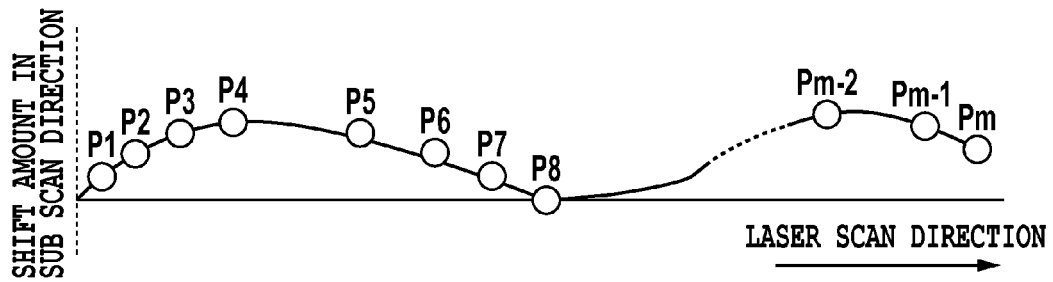
FIG.9A
| SCAN LINE CHANGING POINT | P1 | P2 | P3 | P4 | P5 | P6 | P7 | P8 | ...... | Pm-2 | Pm-1 | Pm |
|---|---|---|---|---|---|---|---|---|---|---|---|---|
| DIRECTION | ↑ | ↑ | ↑ | ↓ | ↓ | ↓ | ↓ | ↑ | ...... | ↓ | ↓ | - |
FIG.9B
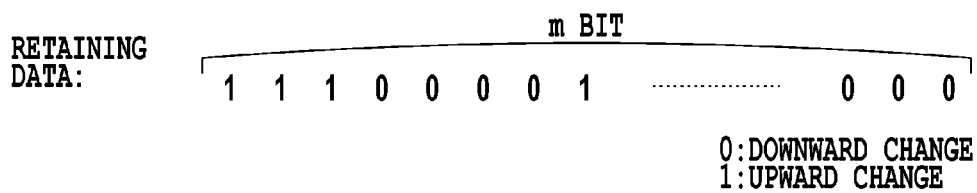
0: DOWNWARD CHANGE
1: UPWARD CHANGE
FIG.9C

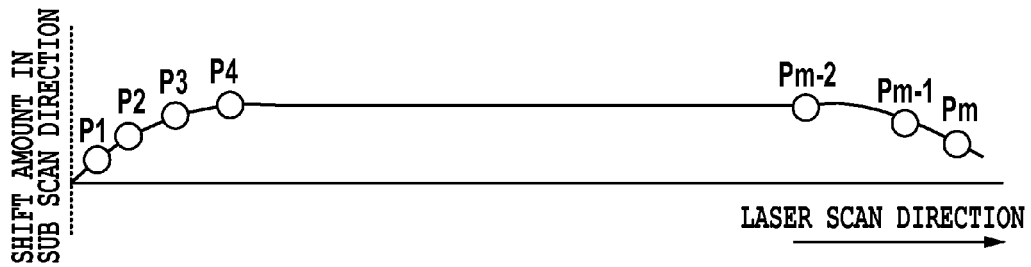
FIG.11A
| SCAN LINE CHANGING POINT | P1 | P2 | P3 | P4 | ............ | Pm-2 | Pm-1 | Pm |
|---|---|---|---|---|---|---|---|---|
| DIRECTION | ↑ | ↑ | ↑ | ↑ | ............ | ↓ | ↓ | - |
FIG.11B
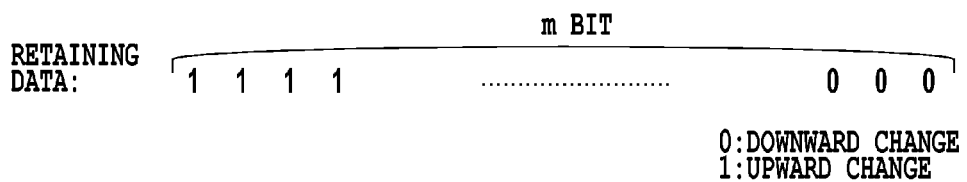
FIG.11C

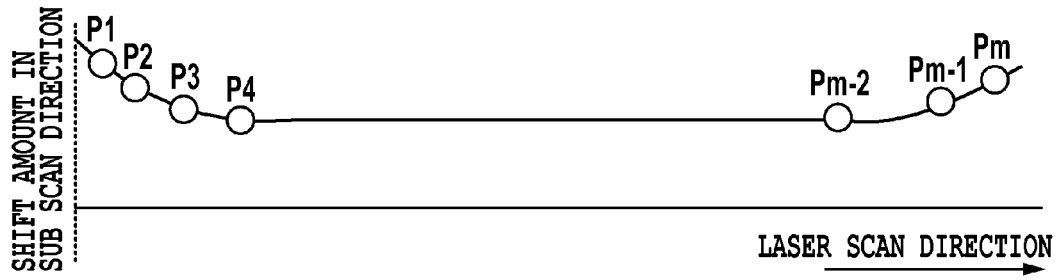
FIG.12A
| SCAN LINE CHANGING POINT | P1 | P2 | P3 | P4 | ............ | Pm-2 | Pm-1 | Pm |
|---|---|---|---|---|---|---|---|---|
| DIRECTION | ↓ | ↓ | ↓ | ↓ | ............ | ↑ | ↑ | ↑ |
FIG.12B
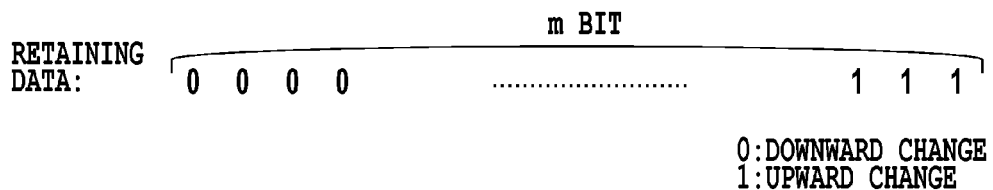
0: DOWNWARD CHANGE
1: UPWARD CHANGE
FIG.12C

| BEAM | B1 | B2 | B3 | B4 |
|------|----|----|----|----|
| POLARITY | 1 | 1 | 0 | 0 |

0:DOWNWARD CHANGE
1:UPWARD CHANGE

| BEAM GROUP | G1 | G2 |
|---|---|---|
| BEAM | B1,B2 | B3,B4 |
| POLARITY | 1 | 0 |
| AVERAGE TILT | 0.005 | 0.015 |
| AVERAGE CURVATURE [1/mm] | 0.043 | 0.058 |
| WORST CURVATURE | 0.02 | 0.08 |
| WORST CURVATURE [1/mm] | 0.062 | 0.093 |

0:DOWNWARD CHANGE
1:UPWARD CHANGE

| BEAM | B1 | B2 | B3 | B4 |
|---|---|---|---|---|
| INTERVAL [μm] | 21 | 21 | 21 | 21 |

| BEAM GROUP | G1 | G2 |
|---|---|---|
| BEAM | B1,B3 | B2,B4 |
| POLARITY | 1 | 1 |
| AVERAGE TILT | 0.006 | 0.013 |
| AVERAGE CURVATURE [1/mm] | 0.04 | 0.059 |
| WORST CURVATURE | 0.025 | 0.076 |
| WORST CURVATURE [1/mm] | 0.056 | 0.087 |

0:DOWNWARD CHANGE
1:UPWARD CHANGE (a) INCLINATION DEVIATION AMOUNT (b) BITMAP IMAGE (BEFORE CORRECTION)

(c) CORRECTED BITMAP IMAGE (d) BITMAP IMAGE (AFTER CORRECTION)

(e) EXPOSURE IMAGE

IMAGE FORMING APPARATUS AND IMAGE FORMING METHOD

BACKGROUND OF THE INVENTION

1. Field of the Invention

The present invention relates to a color image forming apparatus provided with a multi-laser beam.

2. Description of the Related Art

There is known an electrographic process as an image printing process used in a color image forming apparatus such as a color printer or a color copy machine. The electrographic process is configured to forma latent image on a photosensitive drum using laser beams and develop the latent image with a charged color material (hereinafter, called toner). The printing of the image is performed by transferring the image developed by the toner on a transfer paper for fixation.

Recently there has been increasing an image forming apparatus equipped with a multi-laser beam for high-speeding of image formation in the color image forming apparatus of the electrographic process. Particularly there has been increasing a color image forming apparatus of a tandem process equipped with developers and photosensitive drums each number of which is the same as the color number of the toner to sequentially transfer images of different colors on an image transporting belt or on a print medium. There is known in public that in the color image forming apparatus of the tandem process using the multi-laser beam, there exist plural factors causing a misregistration, and therefore various types of measures are proposed for coping with each factor.

The factor is composed of ununiformity or a mount position shift of lens in a deflection and scanning device or a mount position shift of the deflection scanning device to the color image forming apparatus body. This position shift causes tilt or curvature of scan lines, and the degree or the direction of the curvature differs in each color to cause the misregistration. Hereinafter, in the present specification, information in regard to the scan line, such as polarity or a scan interval of a beam, which will be described later, in addition to the tilt of the san line and the degree and direction in the curvature thereof, is called a profile.

The tilt or the degree in the curvature of the scan line differs in each image forming apparatus, that is, each print engine, further each color. An example thereof is shown in FIG. 17A to FIG. 17D. In FIGS. 17A to 170, a lateral axis shows a position of the image forming apparatus in the main scan direction. A line 2000 linearly expressed in the main scan direction shows an ideal profile characteristic with no curvature. In addition, each of line 2001, line 2002, line 2003 and line 2009 shown by curvature lines shows a profile characteristic for each color. That is, line 2001 shows a characteristic of cyan (hereinafter, called C), line 2002 shows a characteristic of magenta (hereinafter, called M), line 2003 shows yellow (hereinafter, called Y) and line 2004 shows black (hereinafter, called K). A longitudinal axis shows a shift amount in the vertical scan direction (sub scan direction) to the ideal profile characteristic. As apparent from the figure, a curvature direction or a changing point of the curvature line differs in each color, and this difference appears as a misregistration in the fixed image data.

Japanese Patent Laid-Open No. 2004-170755 shows, as a measure method against the misregistration, a method where an optical sensor is used to measure a tilt and a magnitude of the curvature of each of the scan lines, a bit map image data is corrected to cancel out them and the corrected image is formed. According to this method, since the image data is electrically corrected, a mechanical adjustment member or an adjustment process at assembling is unnecessary. Therefore, it is possible to downsize the color image forming apparatus. The electrical correction of the misregistration is classified into correction in a one-pixel unit and correction in a unit of less than one pixel. FIG. 18 shows diagrams explaining the correction in a one-pixel unit. A longitudinal axis in FIG. 18 shows a sub scan direction of a sheet and a lateral axis therein shows a main scan direction thereof. (a) of FIG. 18 is a profile characteristic of a laser irradiation showing that the scan line is bent in the reverse direction of the sub scan direction to the main scan direction. The correction in the one-pixel unit is made such that, as shown in (b) of FIG. 18, a pixel is offset in the one-pixel unit in the sub scan direction corresponding to each correction amount of the tilt and the curvature. It should be noted that, in the following description, a position for offsetting is called a scan line changing point. That is, in (a) of FIGS. 18, P1 to P5 correspond to scan line changing points. (c) of FIG. 18 is a diagram showing an image scanned after correction which is offset in the one-pixel unit in the sub scan direction.

The correction in a unit of less than one pixel is, as shown in FIG. 19, made by adjusting a gradation value of the bit map image data with pixels in the sub scan direction after and before the gradation correction. That is, as in (a) of FIG. 19, in a case where the profile characteristic is bent in an upward direction, the bit map image data before the gradation correction is treated in a direction opposite to the upward direction, that is, in a downward direction at the sub scan side. Making the correction in the unit of less than one pixel according to such method enables an unnatural step in the boundary of the scan line changing point caused by the correction in the one-pixel unit to be eliminated, thus achieving smoothing of the image.

In a case of applying the aforementioned conventional technology to the image forming apparatus equipped with the multi-laser beam, the electrical misregistration correction has to be made to various types of profile characteristics of the respective beams constituting the multi-laser beam.

On the other hand, since a circuit scale used for the correction increases, a simplified correction unit is required to be mounted in a low end product. For example, in consideration of elimination of the number in the scan line changing points and tilts or an average value or the worst value of the curvatures in plural laser beams, simplification of the correction unit, such as implementation of a single correction, is performed. In this case, since an optimal correction corresponding to the tilt or the curvature characteristic of each beam is not made, there occurs a problem that the image is degraded.

FIG. 20 is a diagram explaining a mechanism in which the image degradation occurs in a case of using a multi-laser beam formed of four beams. (a) of FIG. 20 shows a profile characteristic of each of the four beams. In this example, each of the first and second beams from the top has the curvature in a direction opposite to the sub scan direction and each of the third and fourth beams from the top has the curvature in the sub scan direction. (b) of FIG. 20 shows a trace of each beam in a case of printing using the four beams. (c) of FIG. 20 and (d) of FIG. 20 are enlarged diagrams of sections shown in (1) and (2) in (b) of FIG. 20. This diagram shows that, in a case where the optimization is not carried out based upon the profile characteristic of each beam, there appear in the end sections, one portion where dots overlap so that a print density is high and the other portion where a location where a dot is supposed to be struck is blank so that the print density is low. Of course, in some cases, all the four beams have curvatures in a same direction. Meanwhile, there are some cases where the fixing speed of the toner is changed, such as a case of designating a sheet other than a plain paper (for example, thick paper) at printing or a case of selecting a gloss-up mode for increasing gloss.

SUMMARY OF THE INVENTION

An object of the present invention is to perform good image formation on various types of papers in a color image forming apparatus using a multi-laser beam having a curvature. An image forming apparatus according to the present invention comprises: an exposure unit configured to perform exposure by a multi-beam; a memory unit configured to store a profile characteristic data of each of N pieces of beams constituting the multi-beam; a unit configured to set a fixing speed of a color material; a unit configured to determine the number of the beams based upon the set fixing speed; a unit configured to calculate linearity of each beam based upon the curvature and tilt of each of the N pieces of the beams; a unit configured to select the beams of the determined number in accordance with the calculated linearity; and a control unit configured to control the exposure unit so as to perform the exposure using only the selected beams.

The present invention allows good image formation in a color image forming apparatus using a multi-laser beam having a curvature.

Further features of the present invention will become apparent from the following description of exemplary embodiments (with reference to the attached drawings).

BRIEF DESCRIPTION OF THE DRAWINGS

FIG. 4 is a diagram showing the relationship of FIG. 4A to 4C;

FIG. 5 is a diagram showing the relationship of FIG. 5A and 5B;

FIGS. 5A and 5B are diagrams explaining Interpolation processing of scan line changing points;

FIGS. 6A to 6D are diagrams showing an example of weighting;

FIGS. 9A to 9C are diagrams showing how to retain the data of the profile characteristic;

FIGS. 11A to 11C are diagrams showing calculation of polarity of a profile characteristic;

FIGS. 12A to 12C are diagrams showing calculation of polarity of a profile characteristic;

DESCRIPTION OF THE EMBODIMENTS

<First Embodiment>

Hereinafter, the best mode of carrying out the present invention will be explained with reference to the attached drawings.

Figure 4A:
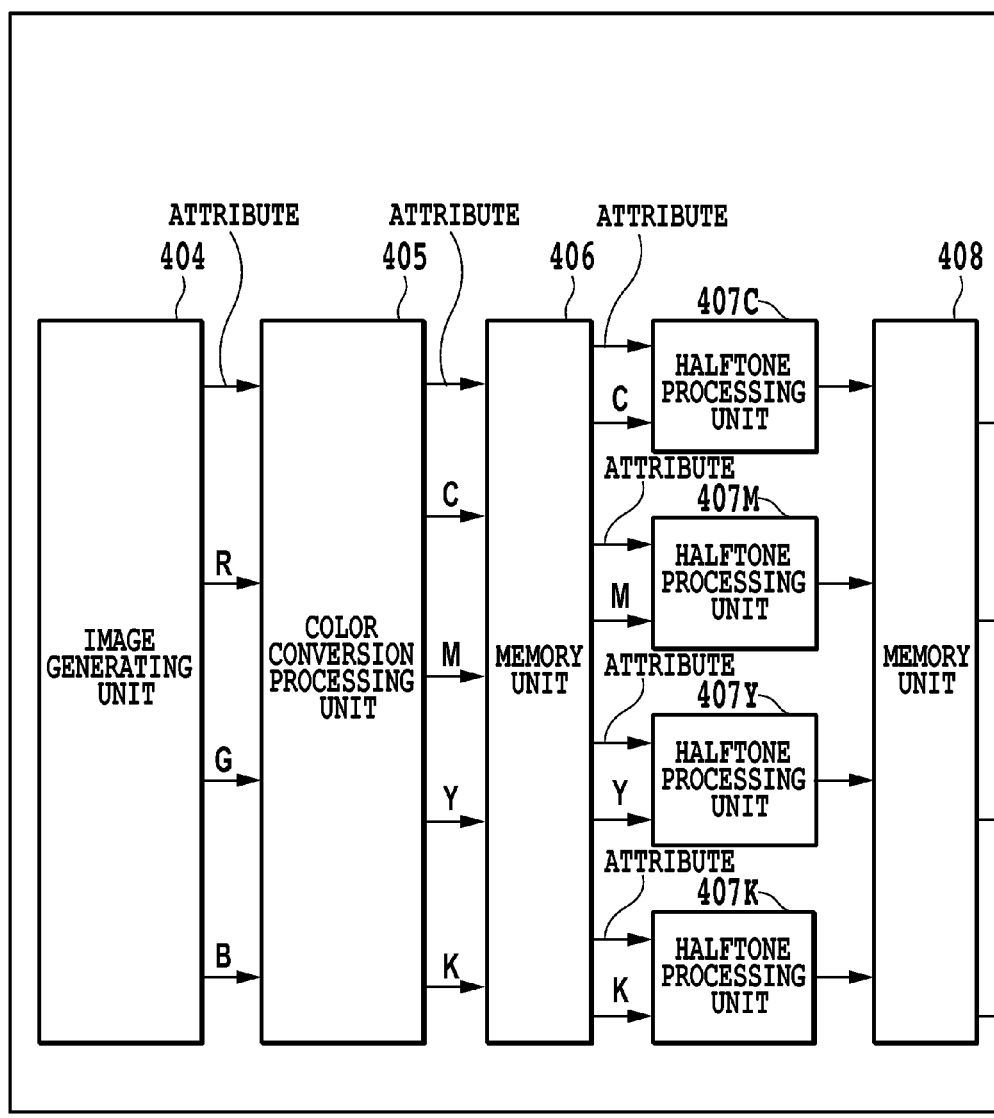
FIGS. 4A to 4C are block diagrams explaining an arrangement of each unit relating to static latent image production in the color image forming apparatus of the electrographic process.
Figure 4B:
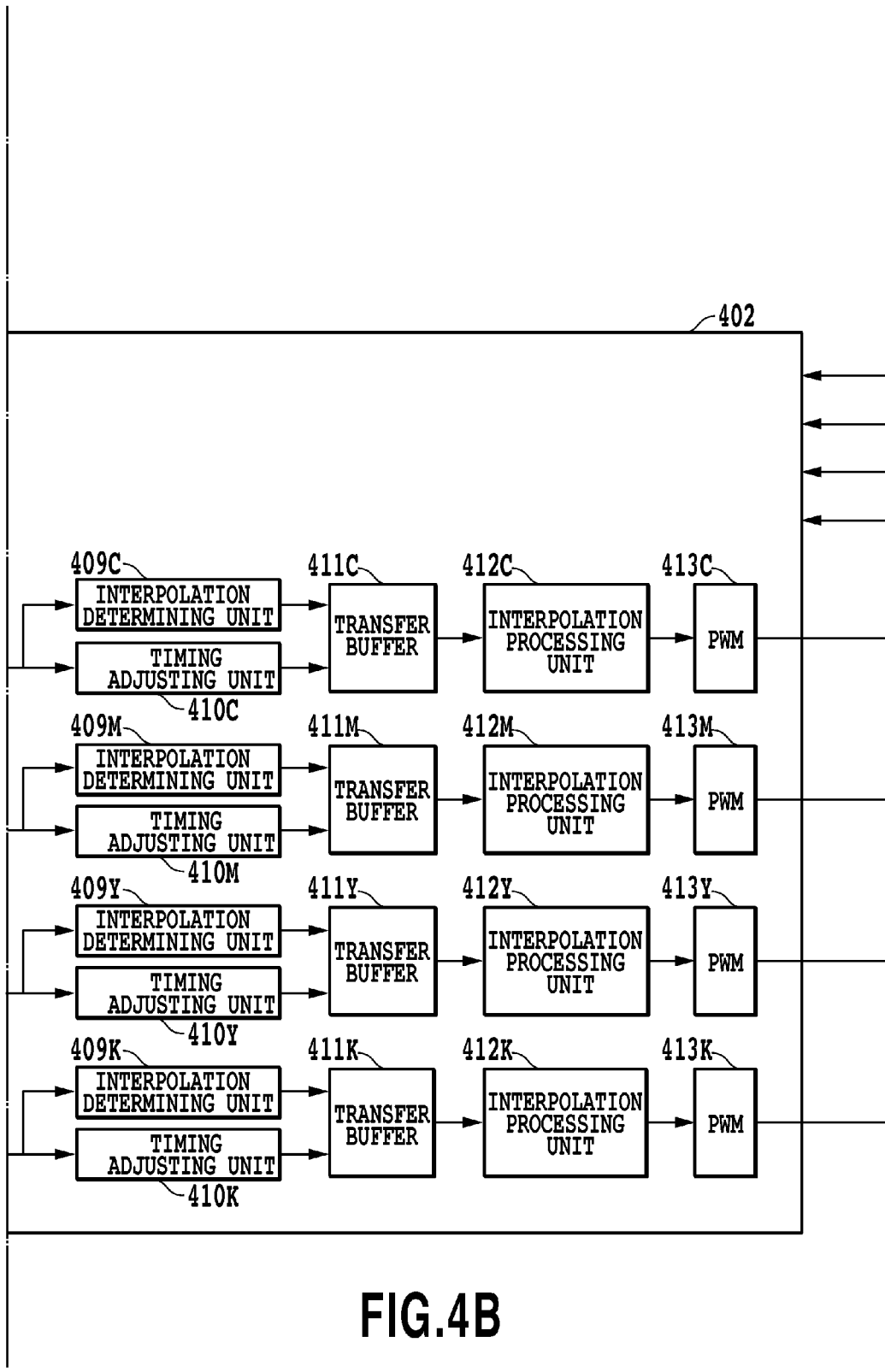
Figure 4C:
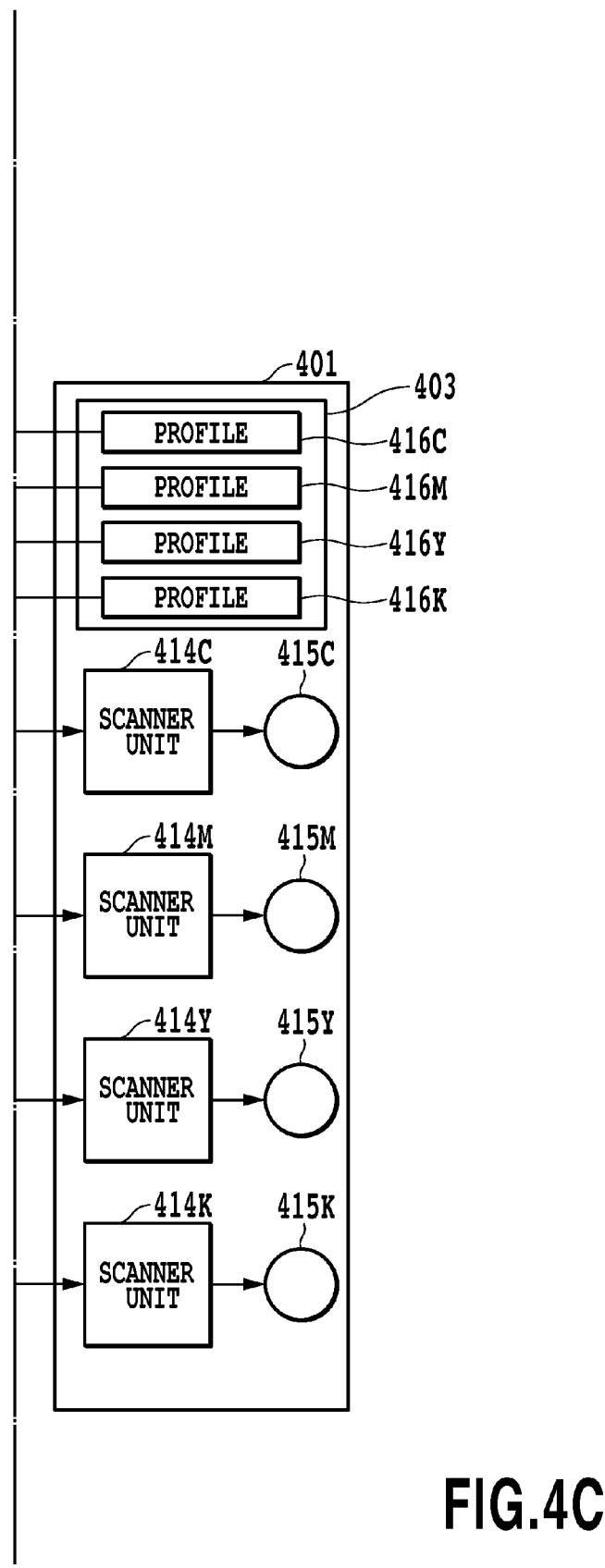

FIGS. 4A to 4C are block diagrams explaining an arrangement of each unit relating to static latent image production in the color image forming apparatus of the electrographic process. The color image forming apparatus is configured by an image forming unit 401 and an image processing unit 402, wherein bit map image information is generated in the image processing unit 402 and the image forming unit 401 performs image formation on a print medium based upon the bit map image information.

Figure 2:
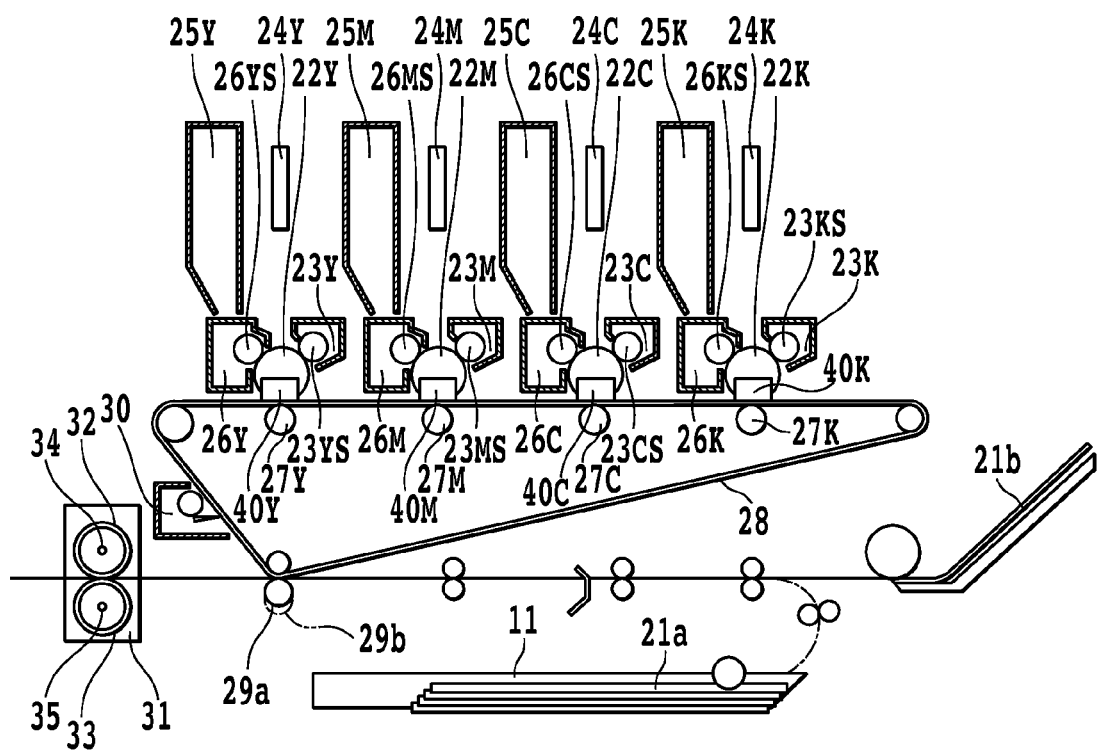
FIG. 2 is a cross section of a color image forming apparatus of a tandem process using an intermediate transfer body as an example of a color image forming apparatus of an electrographic process.

FIG. 2 is a cross section of a color image forming apparatus of a tandem process using an intermediate transfer body 28 as an example of the color image forming apparatus of the electrographic process. Referring to FIG. 2, an operation of the image forming unit 401 in the color image forming apparatus of the electrographic process will be explained.

The image forming unit 401 drives exposure light corresponding to an exposure time which the image processing unit 402 has processed to form a static latent image, and develops the static latent image to form a single-color toner image. The single-color latent images overlap to form a multi-color toner image, which will be transferred and fixed on a print medium 11.

A charging unit is configured by four injection chargers 23Y, 23M, 23C and 23K for charging photosensitive bodies 22Y, 22M, 22C and 22K for respective colors of Y, M, C and K, which are respectively equipped with sleeves 23YS, 23MS, 23CS and 23KS.

The photosensitive bodies 22Y, 22M, 22C and 22K are rotated by transmission of drive forces of drive motors 40Y, 40M, 40C and 40K thereto, and the drive motors 40Y, 40M, 40C and 40K rotate the photosensitive bodies 22Y, 22M, 22C and 22K in a counterclockwise direction in response to the image forming operation.

An exposure unit is configured to irradiate the exposure light on the photosensitive bodies 22Y, 22M, 22C and 22K by scanner units 24Y, 24M, 24C and 24K to selectively expose surfaces of the photosensitive bodies 22Y, 22M, 22C and 22K, thus forming a static latent image. Here, each of the scanner units 24Y, 24M, 24C and 24K is provided with a multi-laser beam which can irradiate plural beams of the exposure light.

A developing unit is configured by four developing devices 26Y, 26M, 26C and 26K performing development for each color of Y, M, C and K for visualizing the static latent image, and the developing devices 26Y, 26M, 26C and 26K are respectively equipped with sleeves 26YS, 26MS, 26CS and 26KS. It should be noted that each developing device 26 is detachable.

A transferring unit rotates the intermediate transfer body 28 in a clockwise direction for transferring a single-color toner image from the photosensitive body 22 to the intermediate transfer body 28. Followed by rotation of the photosensitive bodies 22Y, 22M, 22C and 22K and rotation of primary transfer rollers 27Y, 27M, 27C and 27K positioned opposite thereto, the single-color toner image is transferred. By applying an appropriate bias voltage to the primary transfer roller 27 and differentiating a rotational speed of the photosensitive body 22 from a rotational speed of the intermediate transfer body 28, the single-color toner image is efficiently transferred on the intermediate transfer body 28. This is called a primary transfer.

Further the transferring unit superimposes the single-color toner images on the intermediate transfer body 28 for each station and carries the superimposed multi-color toner image onto a secondary transfer roller 29 followed by the rotation of the intermediate transfer body 28. Further a print medium 11 is held to be carried from a feeding tray 21 to the secondary transfer roller 29 where the multi-color toner image on the intermediate transfer body 28 is transferred on the print medium 11. By applying an appropriate bias voltage to the secondary transfer roller 29, the toner image is statically transferred. This is called a secondary transfer. The secondary transfer roller 29 is in contact with the print medium 11 in a position 29a while transferring the multi-color toner image on the print medium 11, and after the print processing, is in a position 29b away from the print medium 11.

A fixing unit is provided with a fixing roller 32 heating the print medium 11 and a pressing roller 33 pressing the print medium 11 on the fixing roller 32 for melting and fixing the multi-color toner image transferred on the print medium 11 on the print medium 11. The fixing roller 32 and the pressing roller 33 respectively are formed in a hollow shape and accommodate heaters 34 and 35 therein. A fixing device 31 carries the print medium 11 holding the multi-color toner image by the fixing roller 32 and the pressing roller 33 and applies heat and pressure thereon to fix the toner on the print medium 11.

The print medium 11 after the toner fixing is discharged on a discharge tray (not shown) by a discharge roller (not shown) thereafter, ending an image forming operation. A cleaning unit 30 is configured to clean the toner left on the intermediate transfer body 28, and the waste tonner left after transferring the multi-color toner image of four colors formed on the intermediate transfer body 28 on the print medium 11 is accumulated in a cleaner container.

(Profile Characteristic of Scan Line)

Figure 3A:
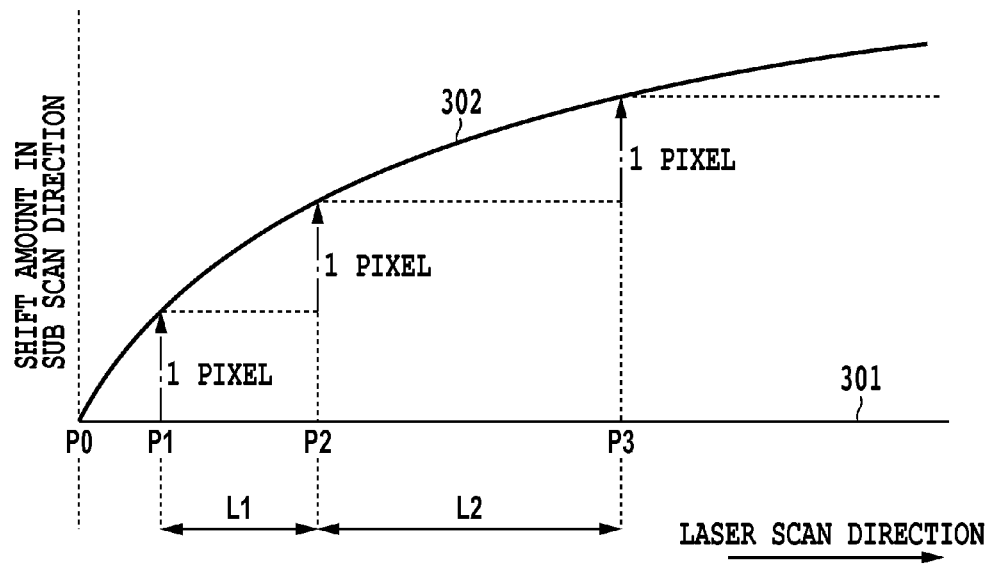
FIGS. 3A and 3B are diagrams each explaining a profile characteristic of a scan line of each color in the image forming apparatus.
Figure 3B:
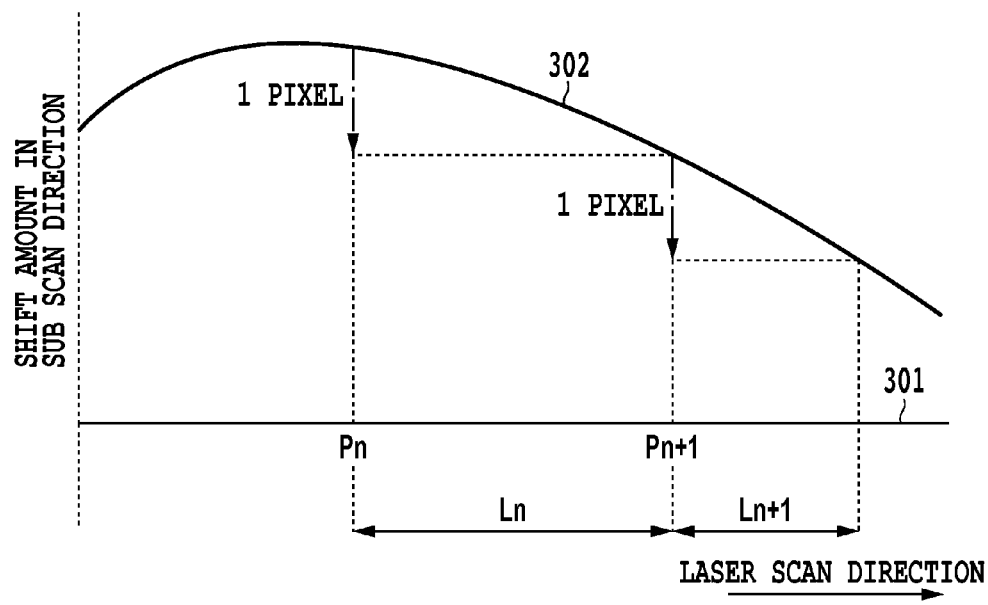

By referring to FIGS. 3A and FIG. 3B, a profile characteristic of a scan line (beam) of each color in the image forming apparatus will be explained hereinafter. In the figure, 3A is a diagram showing a region where a profile characteristic in the image forming apparatus is shifted upward (in a perpendicular direction) in a laser scan direction. In addition, 3B is a diagram showing a region where a profile characteristic in the image forming apparatus is shifted downward (in a perpendicular direction) in the laser scan direction. Denoted at 301 is an ideal scan line, which shows a characteristic in a case where the scan is performed perpendicular to the rotational direction of the photosensitive body 22.

Figure 7A:
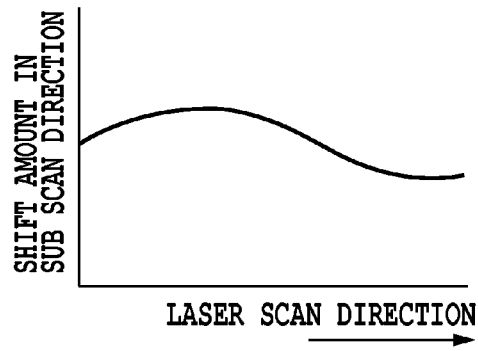
FIGS. 7A to 7D are diagrams showing a correlation between a direction where correction should be made and a shift direction.
Figure 7B:
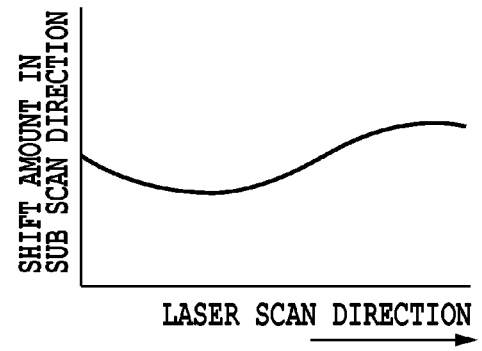
Figure 7C:
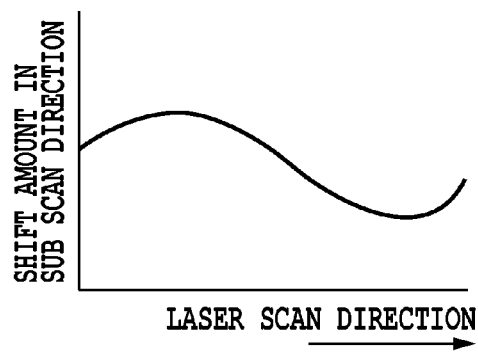
Figure 7D:
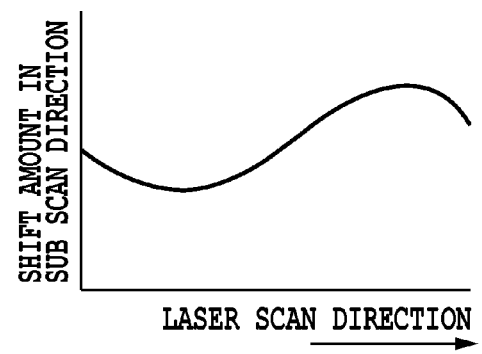

Here, the term of "profile characteristic" is used to show a direction where the correction should be made in the image processing unit 402, but a definition of the profile characteristic is not limited thereto. That is, the profile characteristic is defined as a shift direction of the image forming unit 401 and in the image processing unit 402, correction of the reverse characteristic may be made to cancel out the shift. FIGS. 7A to 7D are diagrams showing a correlation between a direction where correction should be made in the image processing unit 402 and a shift direction of the image forming unit 401. As the direction where the correction should be made in the image processing unit 402, in a case where the profile characteristic is shown as in FIG. 7A, the profile characteristic in the image forming unit 401 is a reverse curvature one (FIG. 7B) to cancel out the profile characteristic in FIG. 7A. In reverse, in a case where the profile characteristic in FIG. 7C is shown as the curvature characteristic of the image forming unit 401, the direction where the correction should be made in the image processing unit 402 is as shown in FIG. 7D.

In addition, an example of a method for retaining data of the profile characteristic may be a method of retaining a pixel position of a scan line changing point in the main scan direction and directionality of a change to the next scan line changing point. Specifically in an example in FIGS. 9A to 9C, scan line changing points P1, P2, P3, . . . Pm are defined in the profile characteristic in FIG. 9A. A definition of each scan line changing point is made as a point where a one-pixel shift occurs in the sub scan direction, and the scan line changing direction is composed of a case where the profile characteristic changes in an upward direction to the next scan line changing point and a case where the profile characteristic changes in a downward direction to the next scan line changing point.

For example, scan line changing point P2 is a point where the scan line changing should be performed in an upward direction to the next scan line changing point P3. In consequence, the scan line changing direction at P2 is an upward direction (↑) as shown in FIG. 9B. Similarly also at P3, the scan line changing direction is an upward direction (↑) to the next scan line changing point P4. The scan line changing direction at the scan line changing point P4 is a downward direction (↓) different from the previous one. An example of a method of retaining the data in this direction uses data of binary digits as shown in FIG. 9C in a case where the data showing an upward direction is expressed by "1" and the data showing a downward direction is expressed by "0". In this case, a retained data amount is in proportion to the number of the scan line changing points, and when the number of the scan line changing points is m pieces, a bit number of the retained data is m bits.

Back to FIG. 3, denoted at 302 is an actual scan line in which a tilt and a curvature occurs due to position accuracy or a shift of a diameter of the photosensitive body 22 and position accuracy of an optical system in the scanner unit 24 of each color (24C, 24M, 24Y and 24K) shown in FIG. 2. The image forming apparatus has the profile characteristic different in each printing device (print engine), and further, the color image forming apparatus has the characteristic different in each color.

(Scan Line Changing Point)

First, scan line changing points in regions where the profile characteristic is shifted upward in the laser scan direction will be explained with reference to FIG. 3A.

The scan line changing point in the present embodiment shows a point which is shifted by one pixel in the sub scan direction. That is, in FIG. 3A, points P1, P2 and P3 which are shifted by one pixel in the sub scan direction on the upward curvature characteristic 302 correspond to scan line changing points. It should be noted that in FIG. 3A, PO is described as a reference. As apparent from FIG. 3A, a distance (L1 or L2) between the scan line changing points is shorter in a region where the curvature characteristic 302 rapidly changes and is longer in a region where the curvature characteristic 302 gradually changes.

Next, by referring to FIG. 3B, the scan line changing point in a region where the profile characteristic is shifted downward in the laser scan direction will be explained. Also in a region showing the downward shifted characteristic, the scan line changing point is defined as a point which is shifted by one pixel in the sub scan direction. That is, in FIG. 3B, points Pn and Pn+1 which are shifted by one pixel in the sub scan direction on the downward curvature characteristic 302 correspond to scan line changing points. It should be noted that in FIG. 3B, as similar to FIG. 3A, a distance (Ln or Ln+1) between the scan line changing points is shorter in a region where the curvature characteristic 302 rapidly changes and is longer in a region where the curvature characteristic 302 gradually changes.

In this way, the scan line changing point relates closely to a changing degree of the curvature characteristic 302 of the image forming apparatus. Therefore, in the image forming apparatus having the rapid curvature characteristic, the number of the scan line changing points increases, and in reverse, in the image forming apparatus having the gradual curvature characteristic, the number of the scan line changing points decreases.

As explained before, since the curvature characteristic of the image forming apparatus differs in each beam and in each color, the number and positions of the scan line changing points differ in each beam and in each color respectively. A difference between the colors results in causing the misregistration in an image in which toner images of all the colors are transferred on the intermediate transfer body 28. The present invention relates to the processing of the scan line changing point, and a detail thereof will be described later using separate drawings.

(Arrangement of Image Processing Unit)

Next, with reference to FIGS. 4A to 4C, an arrangement of the image processing unit 402 in the color image forming apparatus according to the present embodiment will be explained.

An image generating unit 404 generates printable raster image data based upon image data received from a computer device (not shown) or the like and outputs it as RGB data and attribute data showing a data attribute of each pixel for each pixel. It should be noted that the image generating unit 404 may not deal with the image data received from the computer device or like, but a reading unit may be provided in the color image forming apparatus itself and the image generating unit 404 may deal with the image data received by the reading unit. The reading unit herein includes at least a CCD (charged couple device) or a CIS (contact image sensor). A processing unit performing predetermined image processing to the read image data may be provided together with the reading unit. Further, the reading unit is not provided in the color image forming apparatus itself, but the image data may be received through an interface (not shown) from an external reading unit.

Denoted at 405 is a color conversion processing unit which converts RGB data into CMYK data corresponding to toner colors of the image forming unit 402 and stores the CMKY data and the attribute data into a bit map memory unit (memory unit) 406.

The memory unit 406 is a first memory unit arranged in the image processing unit 402 and stores the raster image data therein once. It should be noted that the memory unit 406 may be constituted by a page memory storing image data corresponding to one page or may be constituted by a band memory storing data corresponding to plural lines.

Denoted at 407C, 907M, 907Y and 907K are halftone processing units, which perform halftone processing to attribute data and data of each color outputted from the memory unit 406. A special arrangement of the halftone processing unit is formed of screen processing or error dispersion processing. The screen processing performs N-valued processing using plural predetermined dither matrixes and image data to be inputted. In addition, the error dispersion processing performs N-valued processing by comparing the input image data with a predetermined threshold value and disperses a difference between the input image data at this time and the threshold value to peripheral pixels to be N-valued after that.

Denoted at 408 is a second memory unit constituted inside the image forming apparatus and the second memory unit 408 stores N-valued data processed in the halftone processing unit 407. It should be noted that in a case where a position of an image to be image-processed after the memory unit 408 is a scan line changing point, the scan line changing corresponding to one pixel is performed at a point read from the memory unit 408.

Figure 8A:
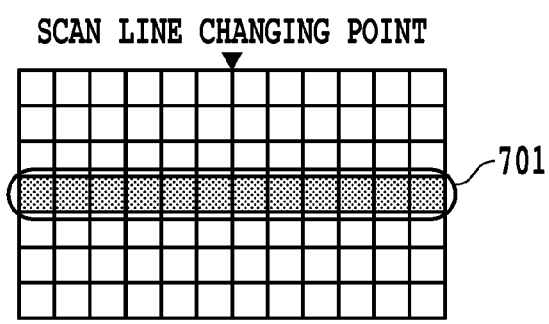
FIGS. 8A to 8C are patterns diagrams showing states of data retained in a memory unit.
Figure 8B:
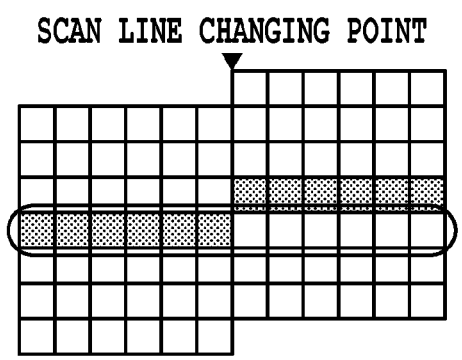
Figure 8C:
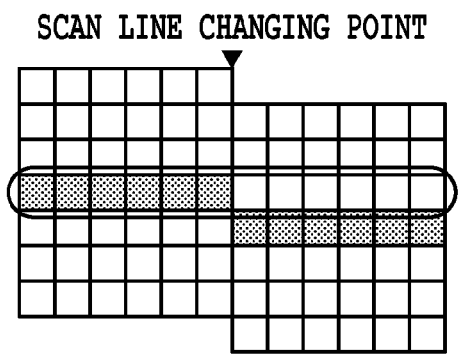

FIG. 8A is pattern diagrams showing a state of data retained in the memory unit 408. As shown in FIG. 8A, the data processed by the halftone processing unit 407 are retained regardless of the correction direction as the image processing unit 402 or the curvature characteristic of the image forming unit 401 in a storing state of the memory unit 408. In a case where the profile characteristic as a direction which should be corrected in the image processing unit 402 is in an upward direction at a point where a line 701 in FIG. 8A is read, the line 701 is shifted by one pixel by the use of the scan line changing point as a boundary as shown in FIG. 8B. In a case where the profile characteristic as a direction which should be corrected in the image processing unit 402 is in a downward direction at a point where the image data in the line 701 is read from the memory unit 408, the line 701 is shifted in a downward direction by one pixel by the use of the scan line changing point as a boundary as shown in FIG. 8C.

Denoted at 409C, 409M, 409Y and 409K are interpolation determining units of the respective colors. The interpolation determining unit determines whether pixels across the scan line changing point of the inputted N-valued data are pixels requiring interpolation or pixels which may not require the interpolation in the post processing.

Denoted at 410C, 410M, 410Y and 410K are timing adjusting units each configured to accomplish synchronization between the N-valued data from the memory unit 408 and the determination result of the interpolation determining unit 409.

Denoted at 411C, 411M, 411Y and 411K are transfer buffers temporarily retaining output data of the interpolation determining unit 409 and the timing adjusting unit 410. It should be noted that in the present explanation, the first memory unit 406, the second memory unit 408 and the transfer buffer 411 are separately configured, but maybe configured by a common memory unit.

Denoted at 412C, 412M, 412Y and 412K are interpolation processing units, which perform interpolation processing to the received data from the transfer buffer 411 based upon the determination result of the interpolation determining unit 409 likewise transferred from the transfer buffer 411. The determination result from the interpolation determination 409 is obtained by a determination for each pixel, and the interpolation processing of the interpolation processing unit 412 uses pixels across the scan line changing point corresponding to the curvature characteristic of the image forming apparatus. Here, the interpolation processing in the scan line changing point will be explained with reference to FIG. 5A and FIG. 5B.

In FIG. 5A, (a) is a diagram showing the curvature characteristic of the image forming apparatus in the laser scan direction. A region 1 is a region where an upward correction is required to make in the image processing unit 402 and in reverse, a region 2 is a region where a downward correction is required to make in the image processing unit 402. It should be noted that hereinafter, the minimum interval between scan line changing points is set as 16 pixels for explanation convenience, but not limited thereto. That is, the minimum interval may be formed by any number of pixels or by a multiplier of two for downsizing a circuit arrangement.

Image data before the scan line changing across the scan line changing point Pa in an example in FIG. 5A, that is, an arrangement of output image data in the halftone processing unit 407 are shown in (b) of FIG. 5A. The attention line is a central line in the image data corresponding to three lines illustrated. The interpolation processing in a one-pixel unit in a case of paying attention on the attention line, that is, an arrangement of image data at the outputting of the memory unit 408 is shown in (c) of FIG. 5A. Since the processing of the scan line changing point exceeding one pixel is performed at a point of reading the image data from the memory unit 408, pixels across the scan line changing point Pa at a point of the inputting into the interpolation processing unit 412 are configured so that a large step appears at the scan line changing point Pa as a boundary.

The interpolation processing unit 412 performs interpolation processing to the image data appearing as the step on the attention line. Since a direction of the correction is upward in the region 1 and the interpolation is performed from back line to front line, the interpolation processing of the attention line is performed by calculation of weighting the image data of the attention line and the back line. The weighting in the present invention is, as shown in (d) of FIG. 5A, described such that a sum of two pixels of the attention line and the back line in the sub scan direction as calculation objects amounts to 16 corresponding to the minimum value of the scan line changing point, but a sum of the weighting coefficients is not limited to 16. For minimizing a circuit used in calculation, the sum may be a multiplier of two, and for improving the accuracy, the sum may be calculated by any coefficient. In addition, as shown in FIGS. 6A to 6D, the weighting coefficient may change in a one-pixel unit as a weighting arrangement or a common weighting coefficient may be used in a unit of plural pixels. Further, the number of targeted pixels may change corresponding to a value of the weighting coefficient. It should be noted that since the scan line changing point is herein positioned to be shifted by one pixel in the sub scan direction to the laser scan direction, the following explanation will be made assuming that a reference position at interpolation is in the left side.

A calculation formula used for interpolation is shown as Formula 1.

(interpolation pixel value)=$W1$×(pixel value by one line earlier than attention line)+$W2$×(attention line pixel value)+$W3$×(pixel value by one line later than attention line) (Formula 1), wherein $W1$, $W2$ and $W3$ are any weighting coefficients.

Figure 5B:
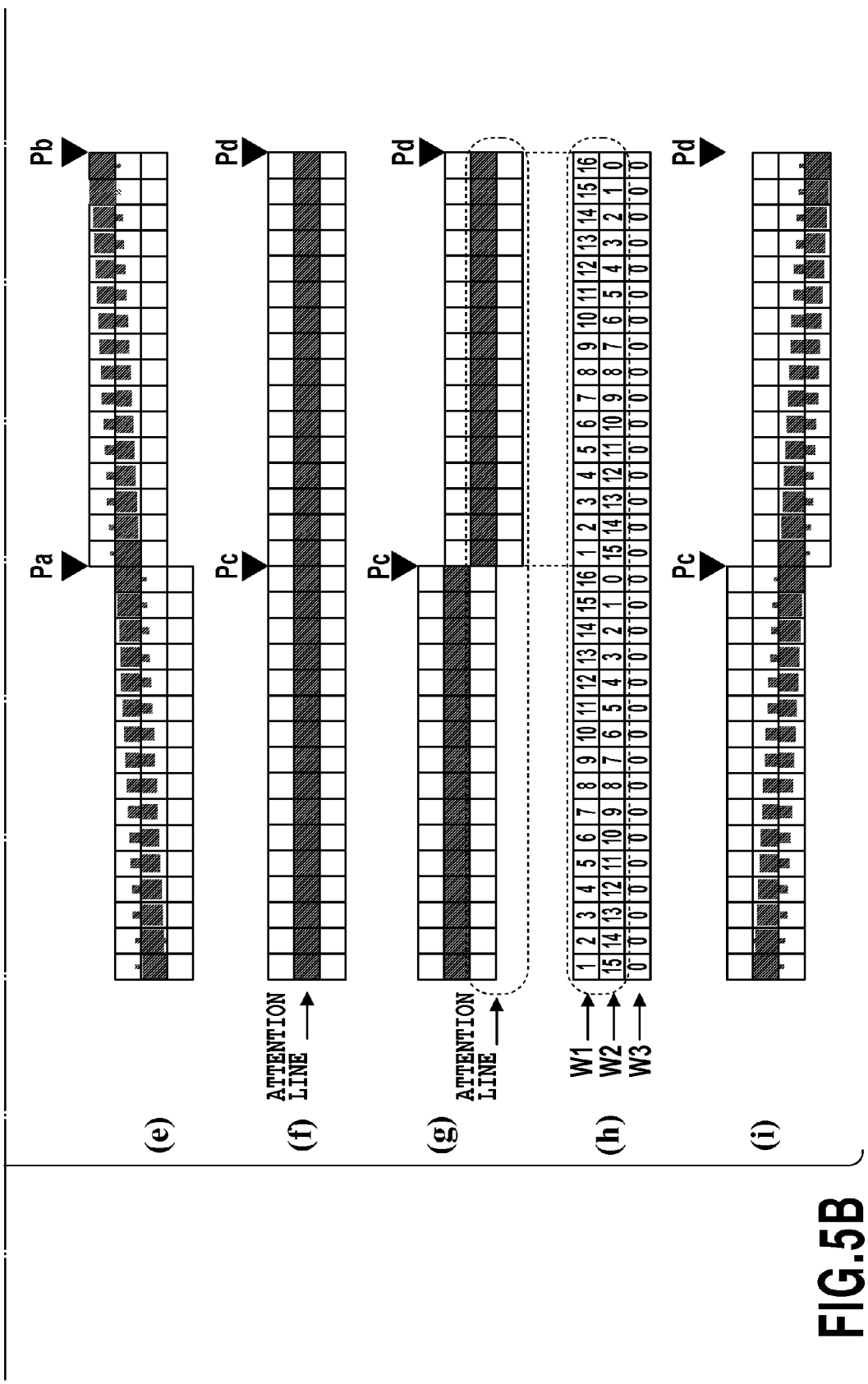

(e) of FIG. 5B shows a conception diagram of the interpolation pixel value obtained by the above Formula 1 in an example of the present explanation. By the interpolation according to Formula 1, a pixel closer to the scan line changing point Pa among pixels before the scan line changing point Pa is more influenced by the pixel value of the back line and a pixel more away from the scan line changing point Pa is more strongly influenced by the attention line, that is, a black data line. In addition, among pixels after the scan line changing point Pa, a pixel closer to the scan line changing point Pa is more influenced by the attention line and a pixel more away from the scan line changing point Pa is more influenced by the back line to the attention line.

Next, there will be explained a region 2 where the downward correction is required to be made. In a case of the downward correction, in reverse to a case of the region 1, weighting coefficients used in calculation of the interpolation pixel value are set to the attention line and the front line.

(f) of FIG. 5B shows image data at the outputting of the halftone processing unit 407, and (g) of FIG. 5B shows image data at the reading by the memory unit 408. Since the downward correction is made in the scan line changing point Pc, a scan line changing processing step exceeding one pixel appears at the scan line changing point Pc as a boundary as shown in (g) of FIG. 5B. Values of $W1$, $W2$ and $W3$ in a case of making the downward correction are as shown in (h) of FIG. 5B, and for explanation convenience, a sum of weighting coefficients amounts to 16 similarly to the upward correction processing time. As the Formula 1 is applied also at the downward correction time, correction pixel values are found in such a manner as to have the scan line changing point Pc as a boundary. Among pixels before the scan line changing point Pc, a pixel closer to the scan line changing point Pa is more influenced by the pixel value of the front line and a pixel more away from the scan line changing point Pc is more strongly influenced by the attention line. In addition, among pixels after the scan line changing point Pc, a pixel closer to the scan line changing point Pc is more influenced by the attention line and a pixel more away from the scan line changing point Pc is more influenced by the front line to the attention line ((i) of FIG. 5B).

In this way, the interpolation processing in the interpolation processing unit 412 prevents the pixel data successive in the main scan direction from appearing as a large step when the direction of the correction is either the upward direction or the downward direction.

Denoted at 413 are pulse width modulations, which perform the processing of converting the image data of each color outputted from the interpolation processing unit 412 into an exposure time of each of scanner units 414C, 414M, 414Y and 414K. The converted image data are outputted from print units 415 in the image forming unit 401.

It should be noted that the data of the aforementioned profile characteristic are retained in the memory unit 403 in the image forming unit 401 as the characteristic specific to the image forming apparatus (profiles 416C, 416M, 416Y and 416K). The image processing unit 402 performs the processing corresponding to the profile characteristic retained in the image forming unit 401.

(Process Order in the Image Forming Apparatus)

Next, the process order of the color image forming apparatus according to the present embodiment will be explained along a flow chart in FIG. 1.

Here, a beam a curvature and/or a tilt of which are the smallest among N pieces of beams (N is a natural numeral equal to or more than two, and here, N is four) constituting the multi-beam is used to explain a case of printing in a print mode with high image quality.

When a user instructs a print of a document or an image data through an external PC (not shown) to the color image forming apparatus, at step 101 the color image forming apparatus receives a print job and analyses a print mode set by a printer driver. That is, it is confirmed whether or not the print mode set by the user is a high quality image mode. A name of the print mode differs in each company, but the high quality image mode in the present embodiment means a mode assuming that a color shift in each color of the output image is minimized for outputting. That is, the high quality image mode is the mode where the curvature is the smallest and the number of occurrence times of the scan line changing points is the smallest in each color. In a case where the high quality image mode is set as a result of the analysis, the process goes to step 102. In a case where the set print mode is not the high quality mage mode, the process goes to step 110. It should be noted that it goes without saying that even in a case where the user selects the high quality image mode on UI in the printing device to perform the copy processing, the processing is likewise possible.

At step 102 the image forming apparatus obtains data 416Y, 416M, 416C and 416K of the profile characteristics in the respective beams 24Y, 24M, 24C and 24K constituting the multi-beam from the image forming unit 401. That is, the image forming apparatus reads out the data of the profile characteristics as shown in FIGS. 9A to 9C stored in the memory unit 403 as the memory unit in the image forming unit 401.

At step 103 the image forming apparatus obtains a curvature and a tilt of each beam from the obtained profile characteristic data. In this case, the curvature is am amount expressing a curvature degree of a curve and, for example, a curvature of a circle having a radius of r can be expressed by 1/r. In addition, the tilt is an amount expressing a tangential tilt of a curve at each scan line changing point.

The curvature and tilt of each beam can be obtained by calculating information showing coordinates and a direction in each scan line changing point contained in the data of the profile characteristic. For example, a curvature of P3 in FIG. 9A (curvature in the laser scan direction) can be obtained by calculating an approximate circle radius from coordinates and directions of P2, P3 and P4. In addition, a tilt of P3 can be obtained by calculating an approximate secondary curve from P2, P3 and P4 and calculating a tangential tilt of each scan line changing point. In addition, by averaging respectively the curvatures and the directions calculated in the respective scan line changing points, the curvature and direction of each beam can be obtained. In regard to a calculation method of the curvature and direction, the number of neighboring scan line changing points may increase for more accuracy.

It should be noted that in place of the calculation to the curvature and tilt at this stage, the result in advance calculated may be contained in the data of the profile characteristic, and the curvature and tilt of each beam may be obtained by referring to those values.

At step 104, the image forming apparatus compares the curvature and tilt of each beam obtained at step 103 respectively with preset given threshold values and determines whether or not they exceed the threshold values. Ina case where either one of the obtained curvature and tilt of each beam exceeds the threshold value as a result of the determination, the process goes to step 105. On the other hand, in a case where they do not exceed the threshold values, the process goes to step 110. It should be noted that the threshold value may be preset in an internal register in the image forming unit 401 or the like.

At step 105 the image forming apparatus calculates linearity showing how approximate each beam is to a straight line, based upon the curvature and tilt obtained at step 103. An example of a calculation method of the linearity includes a method of weighting the obtained curvature and tilt with coefficients in advance set respectively. In this case, the beam in which the numerical values of the weighted curvature and/or tilt are smaller has smaller curvature, that is, higher linearity.

Also at step 106, the image forming apparatus selects a beam with higher linearity, that is, a beam the most approximate to a straight line from the calculation result at step 105.

At step 107 the image forming apparatus sets an engine rotation mode corresponding to the beam number selected at step 106. In a case of the present embodiment, the engine rotation mode for performing control of obtaining a rotational speed capable of forming a static latent image on the photosensitive body by scan of the multi-beam composed of four beams is defined as a regular rotation mode. In a case of setting the engine rotation mode to the regular rotation mode in a situation of selecting only one beam among the multi-beam composed of four beams, that is, in a case of not changing the scan speed, each beam scans by four-line intervals. As a result, the sub scan resolution of the image data is multiplied four times. For avoiding occurrence of such event, a rotational speed (rotational number) in a decelerating rotation mode is set to 1/N (here, ¼) of that in the regular rotation mode.

The rotational speed of the engine herein set corresponds also to a rotational speed of the intermediate transfer body 28 or a speed of image formation in the photosensitive body 22. In the aforementioned example, the engine rotation speed is explained assuming that the output resolution in the regular rotation mode is the same as in the high quality image mode. However, there is, for example, assumed a case where the output resolution in the regular rotation mode is 600 dpi and on the other hand, the output resolution in the high quality image mode is 1200 dpi. In a case where the resolution in the high quality image mode is thus twice as much as the resolution in the regular rotation mode, the decelerating rotation mode is set to ⅛ of the rotational speed in the regular rotation mode. It should be noted that although the detail is omitted, the setting relating to the engine rotation speed in the image forming apparatus is designed to be changed into an optimal setting by changing the engine rotation speed.

At step 108 the image forming apparatus executes the setting for performing the image processing corresponding to the beam selected at step 106 to the image processing unit 402. Specifically the image forming apparatus sets the interpolation processing unit 412 in the image processing unit 402 so as to make a correction of the reverse characteristic in such a manner as to cancel out the profile of the beam selected at step 106 based thereon.

At step 109 the image forming apparatus sets the output of the image data to be the output by the selected beam (one-line output). Specifically the pulse width modulation 413 in the image processing unit 402 is set such that the image data are outputted from one beam only selected at step 106. In consequence, the multi-laser beam provided in each of the scanner units 24Y, 24M, 24C and 24K is controlled such that the exposure light is irradiated from the selected one beam only.

On the other hand, in a case where at step 101 the high quality image mode is not set or in a case where at step 104 the curvature or the tilt does not exceed the predetermined threshold value, at step 110 all the beams in the multi-beam are selected. Here, since the multi-beam is composed of four beams, these four beams are selected.

At step 111 the image forming apparatus sets the engine rotation mode to the regular rotation mode.

At step 112 the image forming apparatus sets each of the selected four beams for performing the image processing to the each. Specifically all the four beams are set such that the interpolation processing unit 412 in the image processing unit 402 makes a correction of the reverse characteristic to cancel out the profile of the each beam based upon the profile characteristic data 416C, 416M, 416Y and 416K of the respective beams.

At step 1113 the image forming apparatus sets the output of the image data to be the output by all the selected beams (plural-line output). In the present embodiment, since the multi-beam is composed of four beams, the pulse width modulation 413 in the image processing unit 402 is set such that the image data are outputted from the four beams selected at step 110. Inconsequence, the multi-laser beam provided in each of the scanner units 24Y, 24M, 24C and 24K is controlled such that the exposure light is irradiated from all the selected four beams.

At step 114 the image forming apparatus receives the image data and starts the processing for printing.

As explained above, according to the image forming apparatus in the present embodiment, it is possible to print an image with high quality by printing using only one beam with the highest linearity.

<Second Embodiment>

The first embodiment has explained a case of selecting the beam with the highest linearity based upon the curvature and tilt of each beam constituting the multi-beam. Next, the second embodiment will explain a case of using polarity of each beam as a determination reference at beam selecting, in addition to the curvature and tilt of each beam. Here, the polarity is an attribute of a beam expressing whether a trace formed at the scanning of each beam is in a convex shape or in a concave shape as a whole. The concave shape expresses upward polarity and the convex shape expresses downward polarity.

Figure 10:
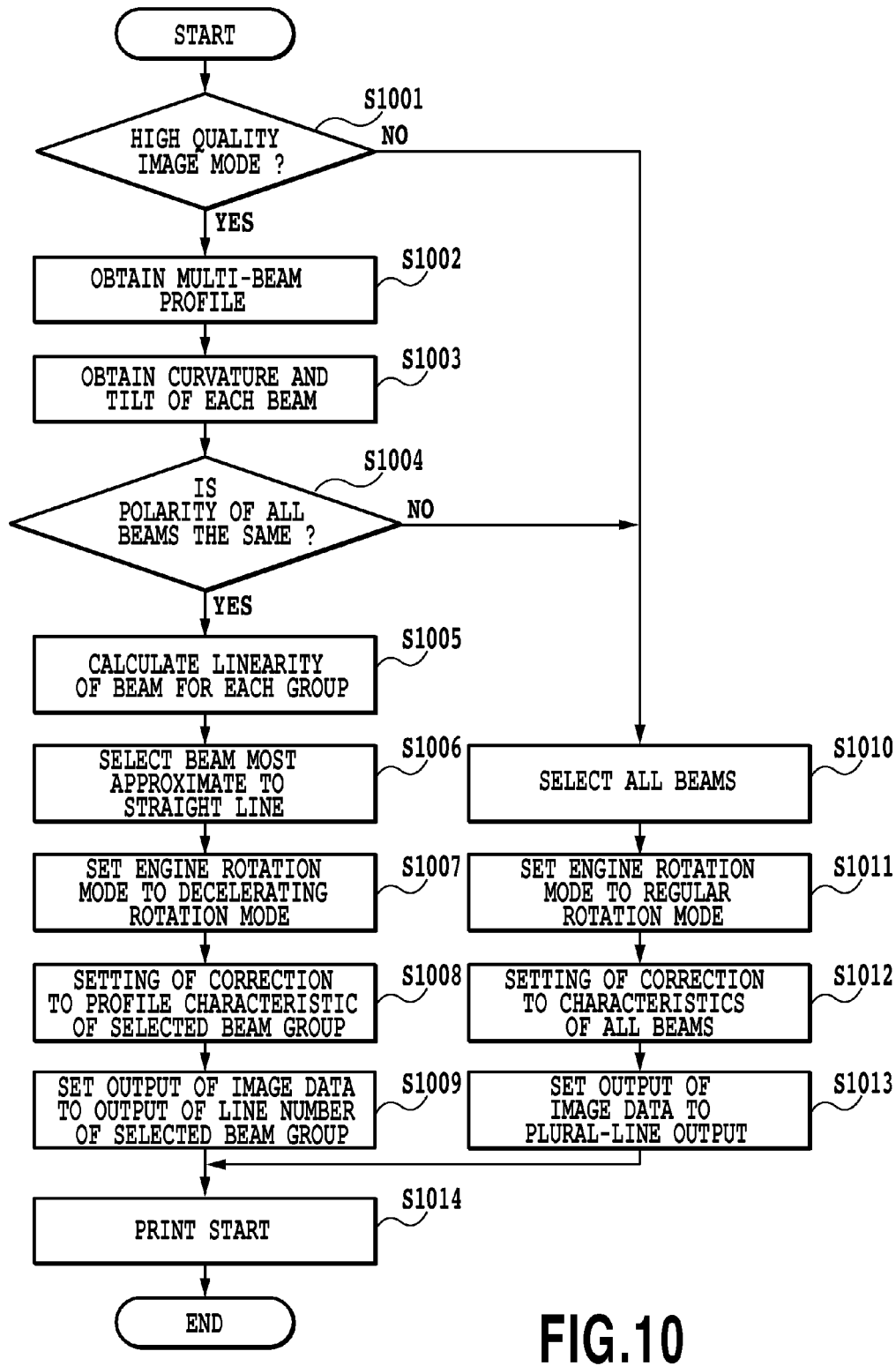
FIG. 10 is a flow chart showing the process order in a color image forming apparatus according to a second embodiment.

FIG. 10 is a flow chart showing the process order in the color image forming apparatus according to the present embodiment. It should be noted that in regard to portions in common with those in the flow chart in FIG. 1 according to the first embodiment, the explanation will be simplified or omitted and here, mainly the different points will be explained.

Figure 1:
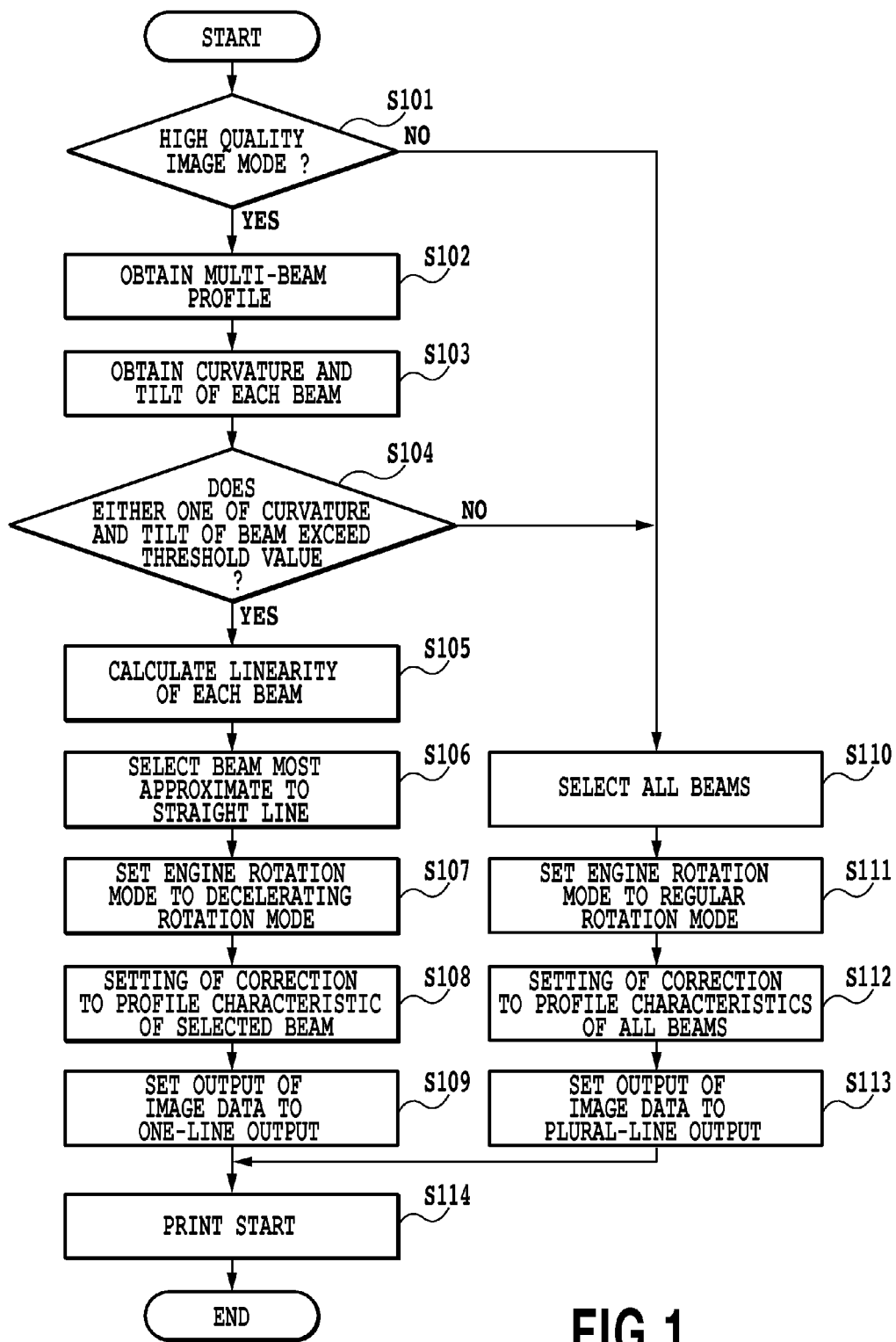
FIG. 1 is a flow chart showing the process order in a color image forming apparatus according to a first embodiment.

Step 1001 and step 1002 are similar to step 101 and step 102 in FIG. 1, wherein the image forming apparatus confirms whether or not the print mode set by the printer driver is a high quality image mode. When it is the high quality image mode, the process goes to step 1002, and when it is not the high quality image mode, the process goes to step 1010.

At step 1002 the image forming apparatus, as similar to step 103 in FIG. 1, obtains data 416Y, 416M, 416C and 416K of the profile characteristics of the respective beams 24Y, 24M, 24C and 24K constituting the multi-beam from the image forming unit 401.

At step 1003 the image forming apparatus obtains the curvature, tilt and polarity of each beam from the profile characteristic data obtained at step 1002. When the data of the obtained profile characteristic are as shown in FIGS. 11A to 11C, the tilt of the beam can be obtained by calculating a tangential tilt of each scan line changing point from coordinates of the corresponding scan line changing point and coordinates of scan line changing points before and after it. In addition, a curvature of the first curvature in the laser scan direction can be obtained by calculating a variation rate in the tangential tilt of each scan line changing point from the coordinates and the directions from P1 to P4. In addition, a curvature of the second curvature can be likewise calculated from the coordinates and directions from Pm-2 to Pm. The polarity can be obtained based upon a profile as shown in FIG. 11A approximate to the secondary curve for simplification. In a case of this figure, since the profile is drawn in a convex curve, it is determined that the polarity is downward (downward polarity). On the other hand, in a case of FIG. 12A where the profile is drawn in a concave curve, it is determined that the polarity is upward (upward polarity).

It should be noted that as similar to a case of the first embodiment, the result calculated in advance in regard to the curvature, tilt and polarity of each beam may be contained in the data of the profile characteristic, and the curvature, tilt and polarity of each beam may be obtained by referring to those values.

Figures 13A, 13B, 13C:
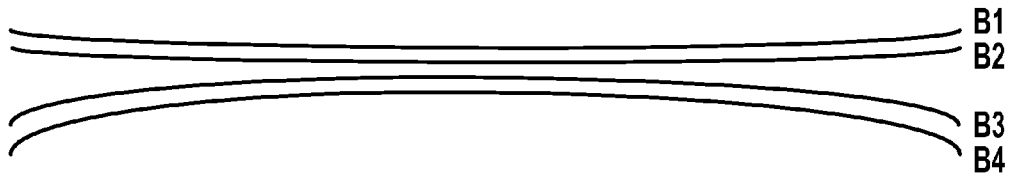
FIGS. 13A to 13C are diagrams explaining grouping of a multi-beam.

At step 1004 the image forming apparatus performs grouping in which the beams having the same polarity with each other are grouped into the same beam group according to the polarity of each beam obtained at step 1003. FIGS. 13A to 13C show an example of the grouping. FIG. 13B shows a result of the grouping in regard to four beams of B1, B2, B3 and B4 in FIG. 13A. As clear from this figure, the four beams are classified into a group (G1) of B1 and B2 having the upward polarity and a group (G2) of B3 and B4 having the downward polarity. In a case where scan intervals of the beams in the sub scan direction are not equal, for example, in a way where B1, B3 and B4 have the upward polarity and B2 has downward polarity, the grouping is performed such that the scan intervals of the beams are equal. That is, the grouping is performed to form group 1 (B1), group 2 (B2) and group 3 (B3 and B4) as groups. In a case where plural beam groups are formed at the present step, the process goes to step 1005, and in a case where the grouping is not performed, that is, in a case where it is determined that all the beams have the same polarity, the process goes to step 1010.

At step 1005 the image forming apparatus calculates linearity of the beam in a group unit classified at step 1004. This is equivalent to an event where, for example, the curvatures and the tilts of the respective beams in the group are weighted to average a sum of the curvatures and a sum of the tilts, thereby completing a table as shown in FIG. 13C. It should be noted that other than the method in which the average value is thus found after the weighting, there may be adopted a method of extracting the worst value of each of the curvatures and the tilts in a group unit in regard to the curvature and tilt likewise as shown in FIG. 13C. In any case of the average value and the worst value, the beam group having a smaller numerical value is defined as the beam group with higher linearity.

At step 1006 the image forming apparatus selects a beam group with the highest linearity, that is, a beam group the most approximate to a straight line from the linearity of each beam group calculated at step 1005. In an example in FIG. 13C, the beam group G1 (B1 and B2) in which each average value (or the worst value) of the curvatures and the tilts is smaller is selected.

At step 1007 the image forming apparatus sets an engine rotation mode corresponding to the number M (M is a natural number) of the beams contained in the beam group selected at step 1006. In the above example where beam group G1 in FIG. 13C is selected, since two beams (M=2) among the multi-beam of four beams (N=4) are selected, the engine rotation mode is set to a decelerating rotation mode in which the rotational speed is ½ (that is, M/N) of that in a regular rotation mode. It should be noted that similarly to a case of the first embodiment, the detail is omitted, but the setting relating to the engine rotation speed in the image forming apparatus is changed into an optimal setting by changing the engine rotation speed.

At step 1008 the image forming apparatus executes the setting for performing the image processing corresponding to the beam group selected at step 1006 to the image processing unit 402. Specifically the image forming apparatus sets the interpolation processing unit 412 in the image processing unit 402 so as to make a correction of the reverse characteristic in such a manner as to cancel out the profile of each beam in the beam group selected at step 1006 based thereon.

At step 1009 the image forming apparatus sets the output of the image data to be the output by the line number (beam number) of the selected beam group. Specifically the pulse width modulation 413 in the image processing unit 402 is set such that the image data are outputted from the beam in the beam group only selected at step 1006. In consequence, the multi-laser beam provided in each of the scanner units 24Y, 24M, 24C and 24K is controlled such that the exposure light is irradiated from the beam in the selected beam group only.

On the other hand, in a case where at step 1001 it is determined that the high quality image mode is not set or in a case where at step 1004 it is determined that all the beams have the same polarity, at step 1010 all the beams in the multi-beam are selected.

Since the content of each processing of step 1011 to step 1014 subsequent to step 1010 is similar to that of step 111 to step 114 in the flow chart in FIG. 1 according to the first embodiment, the explanation is omitted.

As explained above, according to the image forming apparatus in the present embodiment, it is possible to print an image with high quality by printing using beams having the same polarity and high linearity.

<Third Embodiment>

Next, the third embodiment will explain a case of using a scan interval of each beam as a determination reference at beam selecting in addition to the curvature and tilt of each beam constituting the multi-beam. Here, the scan interval of the beam is an interval between the respective beams constituting the multi-beam. For example, when the interval is the order of 600 dpi, the interval is expressed as 42 μm and when the interval is the order of 1200 dpi, the interval is expressed as 20.5 μm.

Figure 14:
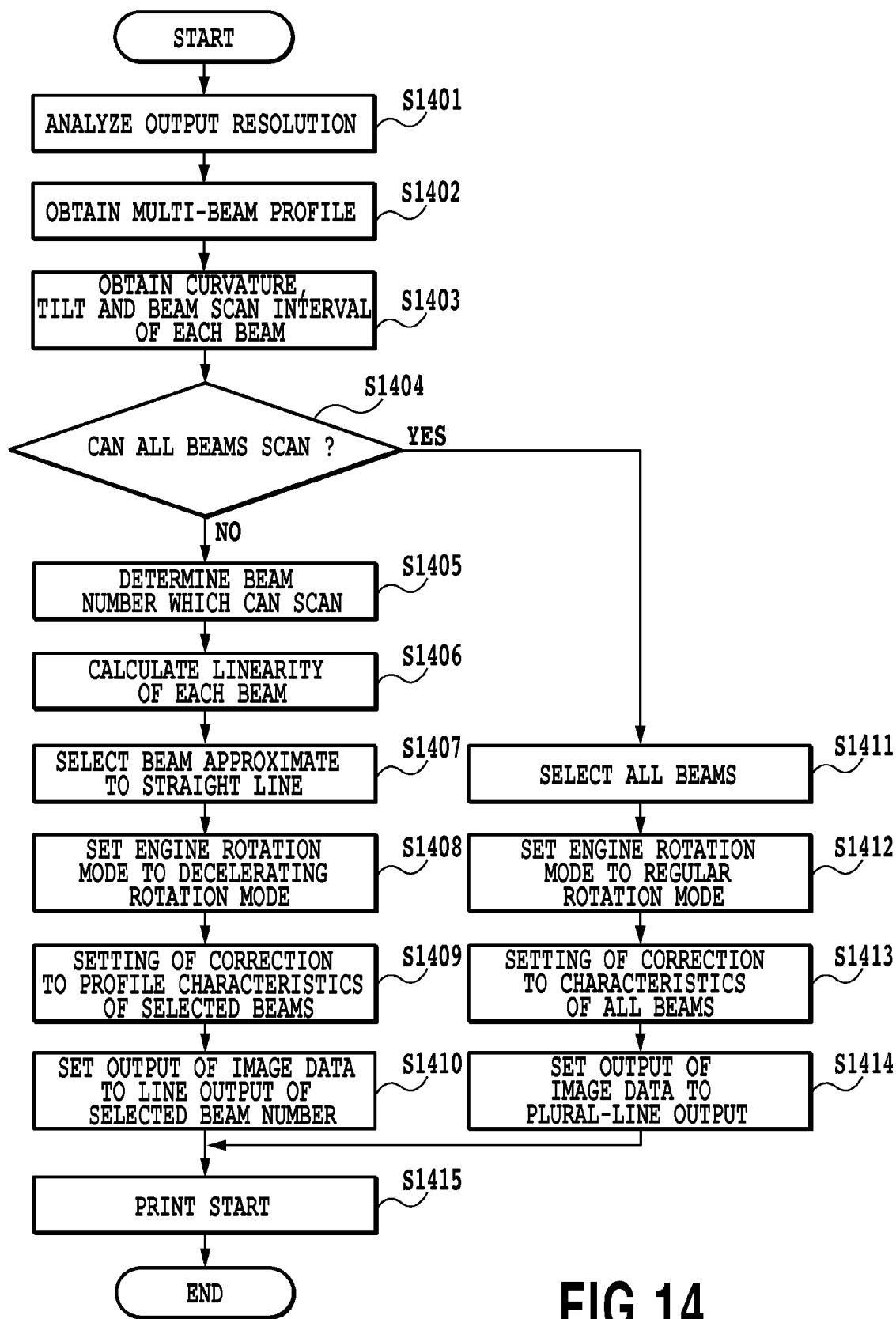
FIG. 14 is a flow chart showing the process order in a color image forming apparatus according to a third embodiment.

FIG. 14 is a flow chart showing the process order in the color image forming apparatus according to the present embodiment. It should be noted that in regard to portions in common with those in the flow chart in FIG. 1 according to the first embodiment, the explanation will be simplified or omitted and here, mainly the different points will be explained.

When a user instructs a print of a document or an image data through an external PC (not shown) to the color image forming apparatus, at step 1401 the color image forming apparatus receives a print job and analyses the output resolution set by a printer driver. An explanation will be made assuming that the output resolution of 1200 dpi is selected by the user and the output resolution of 1200 dpi can be obtained by analysis. It should be noted that in the present embodiment, a case where the beam scan interval of the multi-beam in the sub scan direction is 42 μm (the degree of 600 dpi) and on the other hand, a case where the output resolution is 1200 dpi will be explained as an example, but the output resolution may be the output resolution corresponding to a print engine. It should be noted that it goes without saying that even in a case where the user selects the high quality image mode on UI in the printing device and the copy job in which the output resolution is set as 1200 dpi is received, the similar processing is possible.

At step 1402 the image forming apparatus obtains data 416Y, 416M, 416C and 416K of the profile characteristics of the respective beams 24Y, 29M, 24C and 24K constituting the multi-beam from the image forming unit 401.

At step 1403 the image forming apparatus obtains scan intervals between the respective beams from the profile characteristic data obtained at step 1402. Here, an explanation will be made assuming that the beam scan interval of 42 μm as the order of 600 dpi is obtained by referring to the data in the profile characteristics. It should be noted that it goes without saying that the beam scan interval to be obtained may correspond to the print engine having 1200 dpi, 2400 dpi or the like.

At step 1404 the image forming apparatus compares the obtained beam scan interval with the scan interval of the beam introduced from the output resolution obtained by the analysis to determine whether or not successive scans by all the beams of the multi-beam are possible. Specially it is determined whether the obtained beam scan interval is equal or more than the scan interval of the beam introduced from output resolution. When it is equal to or more than the scan interval of the beam introduced from output resolution, it is determined that the successive scans are possible. Here, since the obtained scan interval of the beam is 42 μm equivalent to 600 dpi and on the other hand, the scan interval of the beam introduced from the output resolution of 1200 dpi is 21 μm, it is determined that the successive scans are not possible. Assuming that the output resolution is the order of 600 dpi (42 μm), it is determined that the successive scans are possible. In a case where the successive scans are not possible as a result of the determination, the process goes to step 1405 and in a case where the successive scans are possible, the process goes to step 1411.

At step 1405 the image forming apparatus determines the number of beams usable for scan from the obtained beam scan interval and the output resolution. Here, since the obtained scan interval of the beam is the order of 600 dpi and on the other hand, the output resolution obtained from the analysis is 1200 dpi, the output resolution is higher. As a result, the beam number is determined as "1". In reverse, when the output resolution is lower, for example, when the beam scan interval is the order of 1200 dpi (21 μm) and the output resolution is 600 dpi, the beam number is determined as "2". In addition, when the beam scan interval is the order of 2400 dpi (10.5 μm) and the output resolution is 600 dpi, the beam number is determined as "4".

Figures 15A, 15B, 15C:
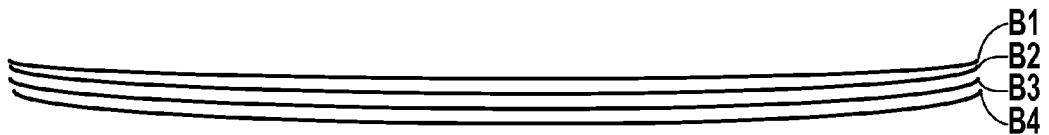
FIGS. 15A to 15C are diagrams explaining grouping of a multi-beam.

At step 1406 the image forming apparatus obtains a curvature and a tilt of each beam from the data of the profile characteristics obtained at step 1402 and calculates linearity of each beam using the obtained curvature and tilt. That is, the processing equivalent to step 103 and step 105 in the flow chart in FIG. 1 is performed at the present step. If it is determined that the beam number is "2" at step 1405, the linearity of the beam is calculated at step 1406 in a combination unit of beams (beam group unit) in which the beam scan interval is not disturbed. For example, when the beam scan interval is the order of 1200 dpi and the output resolution is 600 dpi, the multi-beam is assumed as one having the profile characteristic as shown in FIG. 15A and FIG. 15B. In this case, the linearity of the beam is calculated in two combination units of the beam group G1 (B1 and B3) and the beam group G2 (B2 and B4) as shown in FIG. 15C.

At step 1407 the image forming apparatus selects the beam with higher linearity based upon the calculation result at step 1406. Here, since the beam number calculated at step 1405 is "1", one beam the most approximate to the straight line is selected. If the beam number is determined as "2" at step 1405, one set of the beam group composed of two beams as explained in the second embodiment is selected based upon the linearity of the beam calculated in the aforementioned combination units.

The content of each processing of step 1408 and step 1409 subsequent to step 1407, when the beam number to be selected is "1", is similar to that of step 108 to step 109 in FIG. 1 according to the first embodiment. In addition, when the beam number to be selected is plural (groups), it is similar to that of step 1008 to step 1009 in FIG. 10 according to the second embodiment. That is, in a case of selecting one beam among the multi-beam composed of four beams, the rotational speed is ¼ of that in the regular rotation speed, and in a case of selecting two beams among the multi-beam composed of four beams, the rotational speed is ½ of that in the regular rotation speed. Further, since the content of each processing of step 1411 to step 1415 is similar to that of step 111 to step 114 in FIG. 1 according to the first embodiment, the explanation is omitted.

It should be noted that in the present embodiment, the beam in the sub scan direction is selected based upon the information of the beam scan interval of the profile in the sub scan direction, but the beam in the main scan direction can be also applicable.

As explained above, according to the image forming apparatus in the present embodiment, it is possible to perform a print by the output resolution selected by a user with high image quality using one or more beams having high linearity.

<Fourth Embodiment>

Next, the fourth embodiment will explain a case of using a fixing speed of a color material (toner) as a determination reference at beam selecting in addition to the curvature and tilt of each beam constituting the multi-beam.

For example, there are some cases where the fixing speed of the toner is changed, such as a case of designating a sheet other than a plain paper (for example, thick paper) at printing or a case of selecting a gloss-up mode for increasing gloss. That is, it is possible to securely fix the toner on the print medium 11 by slowing down the fixing speed more than at a regular time (for example, ½ of the speed), carrying the print medium 11 holding a multi-color toner image with the fixing roller 32 and the pressing roller 33 and applying heat and pressure thereon. In the present embodiment, such setting content of the fixing speed of the toner is used as a determination reference at beam selecting.

Figure 16:
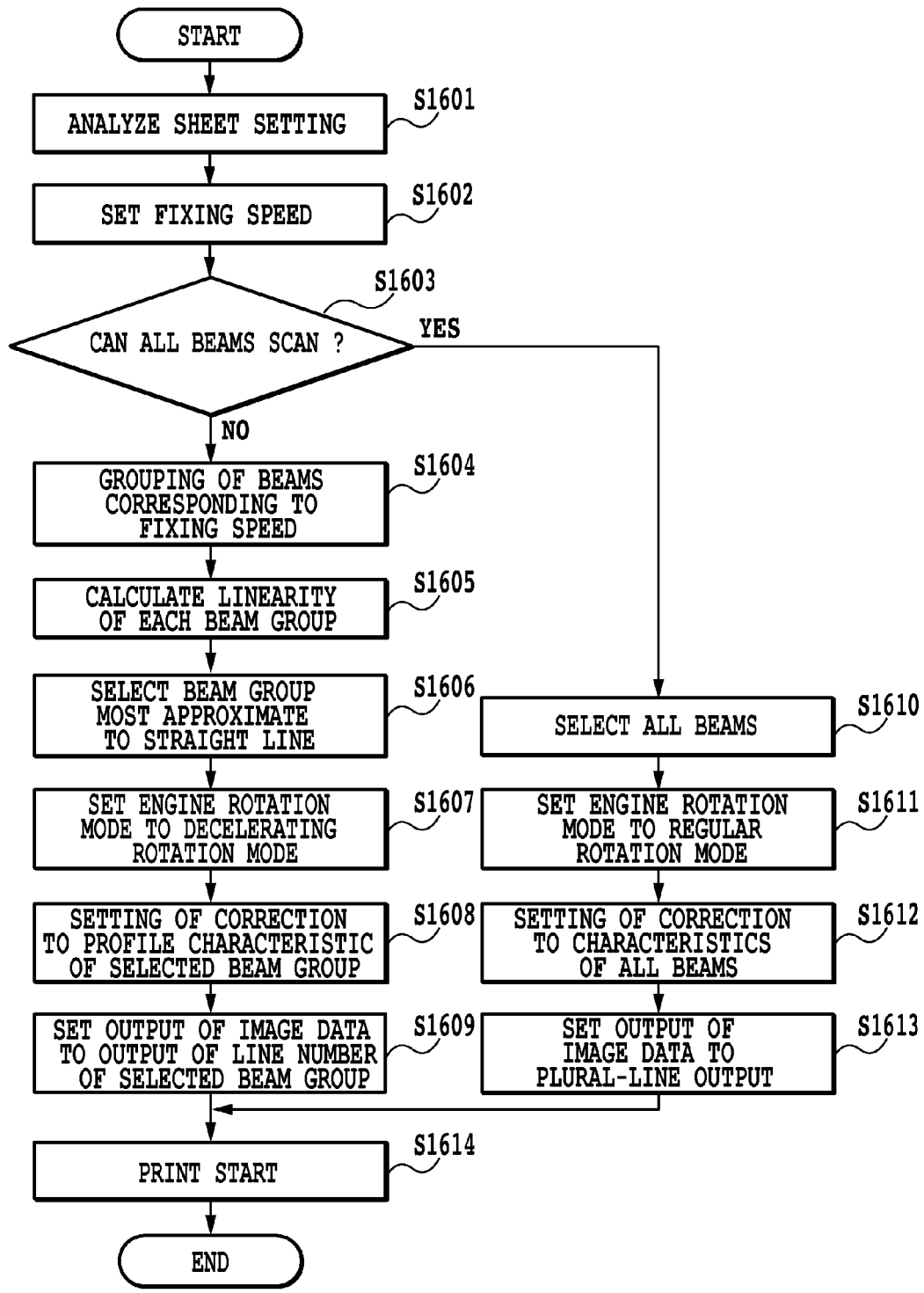
FIG. 16 is a flow chart showing the process order in a color image forming apparatus according to a fourth embodiment.
Figure 17A:
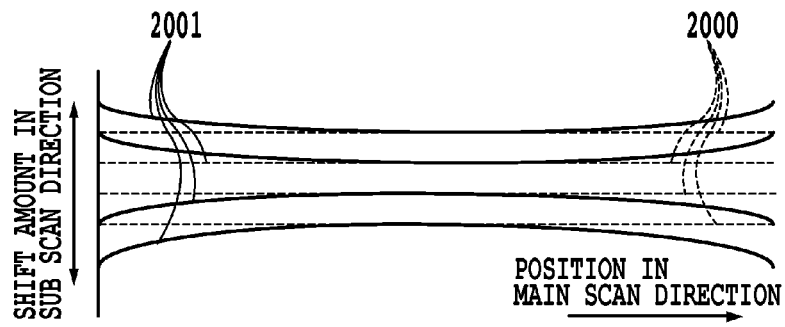
FIGS. 17A to 17D are diagrams showing an example of a profile of a beam for each color.
Figure 17B:
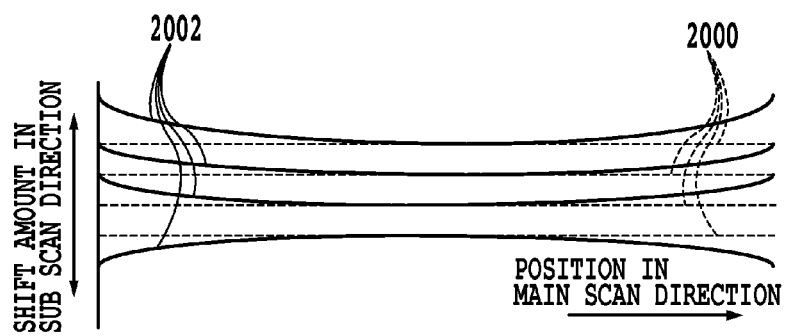
Figure 17C:
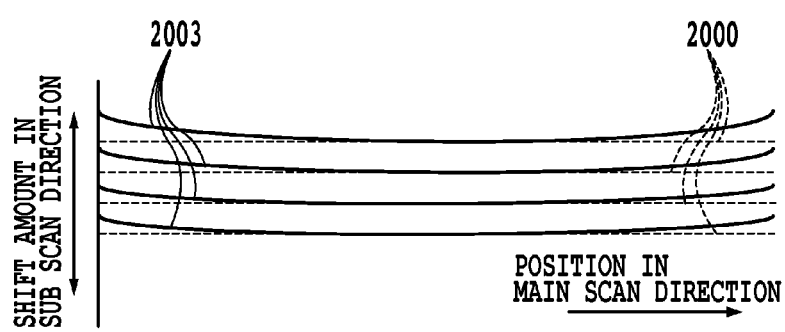
Figure 17D:
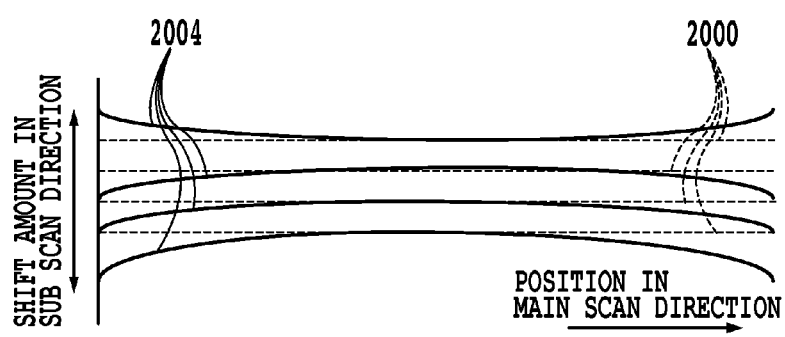
Figure 18:
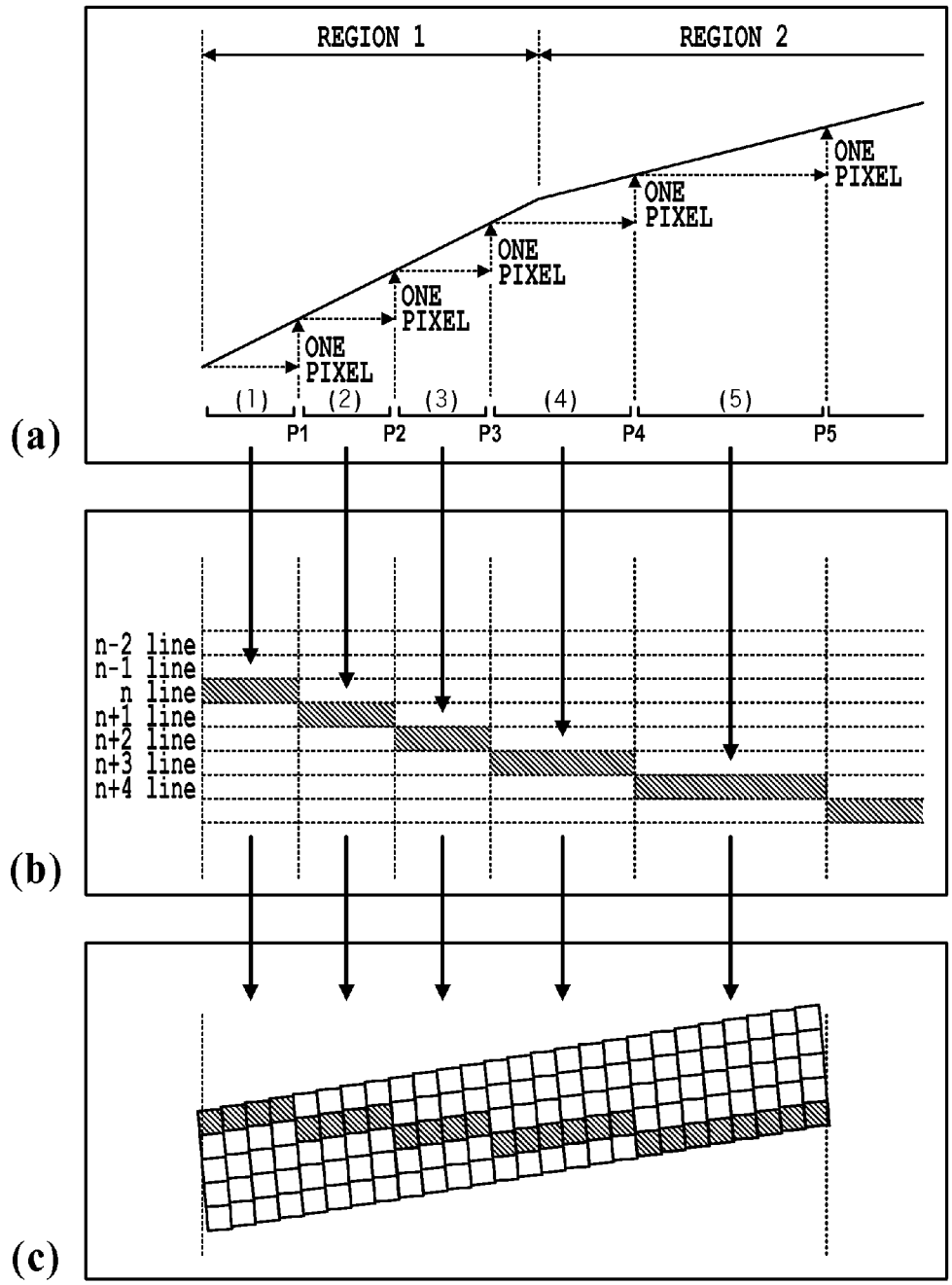
FIG. 18 is a diagram showing explaining correction in a one-pixel unit in an electrical misregistration correction.
Figure 19:
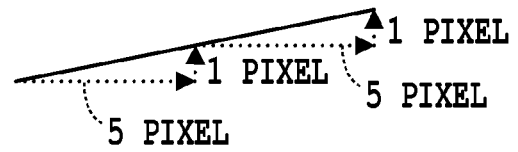
FIG. 19 is a diagram explaining correction in a unit of less than one pixel in the electrical misregistration correction.
Figure 19:
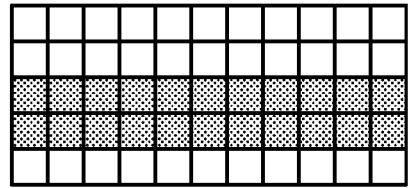
Figure 19:
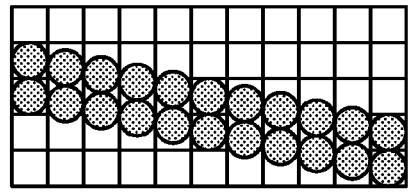
Figure 19:
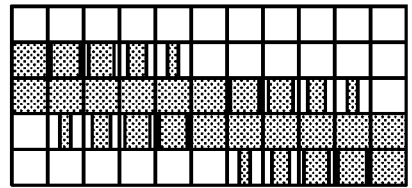
Figure 19:
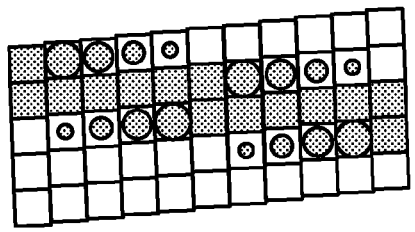
Figure 20:
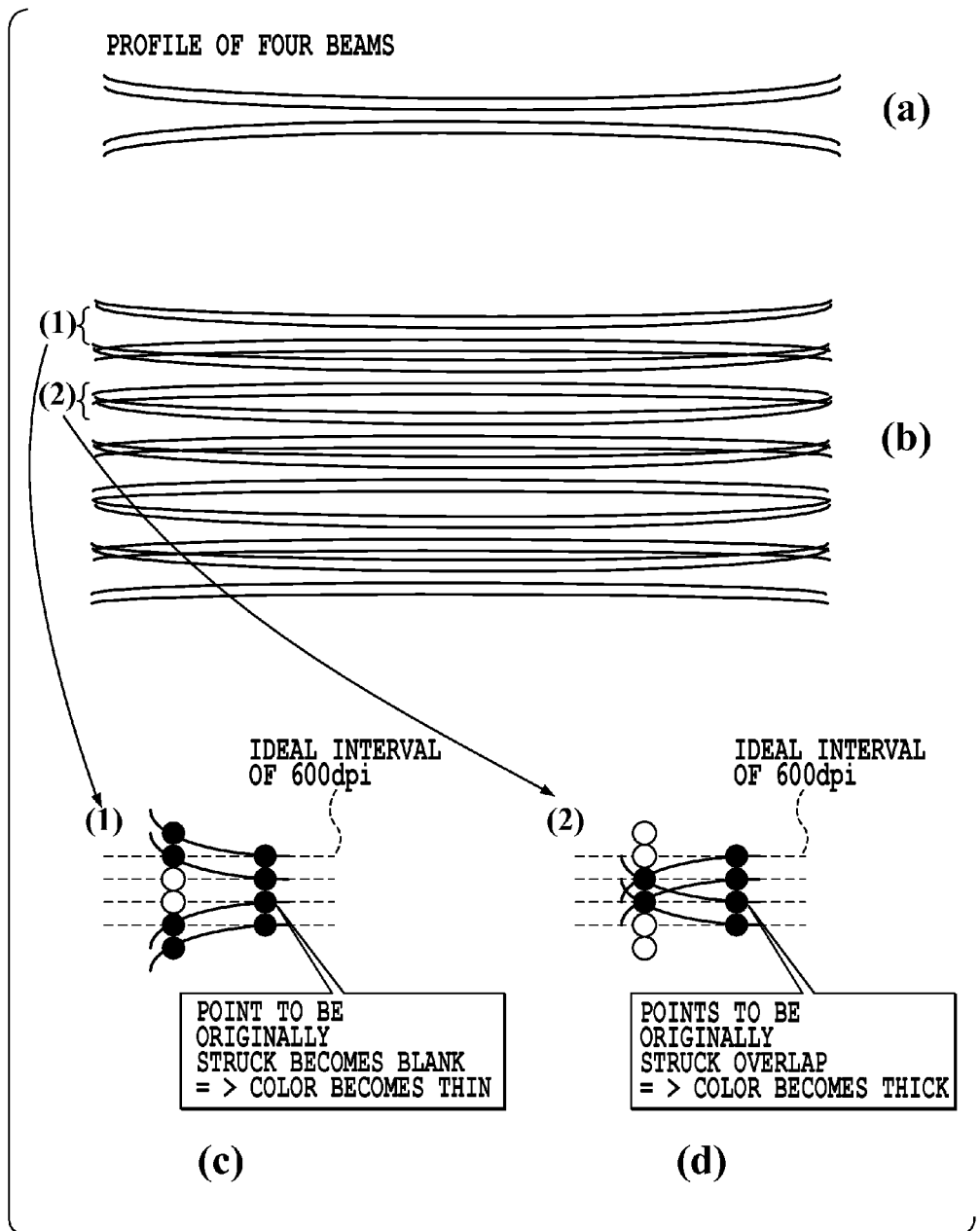
FIG. 20 is a diagram explaining a mechanism in which image degradation occurs in a case of using a multi-laser beam.

FIG. 16 is a flow chart showing the process order in the color image forming apparatus according to the present embodiment.

When a user instructs a print of a document or an image data through an external PC (not shown) to the color image forming apparatus, at step 1601 the color image forming apparatus receives a print job and analyses the content of the sheet setting set by a printer driver. Here, the following explanation will be made assuming that a thick paper is selected as the content of the sheet setting as a result of the analysis. It should be noted that it goes without saying that the similar processing is possible even if a user selects a thick paper as a sheet on UI in the printing device and a copy job is received. In addition, it goes without saying that also in a case where a specific paper other than the thick paper is selected and the fixing speed is changed corresponding to a characteristic of the selected specific sheet, the similar processing is applicable.

At step 1602 the image forming apparatus performs a setting of the fixing speed according to the analysis result at step 1601. Here, since the thick paper is obtained as the analysis result of the sheet setting, the fixing speed of the toner is set to be decelerated to the fixing speed (½ of the speed at a regular time) corresponding to the thick paper.

At step 1603 the image forming apparatus determines whether or not successive scans by all the beams of the multi-beam are possible in the fixing speed set at step 1602. For example, in the multi-beam composed of four beams in which the scan interval of the beam is the order of 600 dpi, in a case where the fixing speed is set to ½ of the speed at a regular time, overlap of the beams occurs so long as the scan speed of the beam is not changed into ½, making it not possible to draw the image data correctly. Therefore, on condition that there is not provided a mechanism for changing the scan speed of the beam to ½, it is determined that the successive scans by all the beams are not possible. Since the image forming apparatus according to the present embodiment is not provided with the mechanism for setting the fixing speed of the beam to ½, it is determined that the scans by all the beams are impossible in a situation where the setting for decelerating the fixing speed to ½ of the speed at a regular time is made. On the other hand, in a case where the analysis result at step 1601 is a plain paper, since a regular fixing speed is set, it is determined that the successive scans by all the beams are possible. As a result of such determination, in a case where it is determined that the successive scans by all the beams are impossible the process goes to step 1604, and in a case where it is determined that the successive scans by all the beams are possible, the process goes to step 1610.

At step 1604 the image forming apparatus calculates the number of the beams usable for scan and groups the respective beams constituting the multi-beam into predetermined beam groups. Specifically the method is as follows.

First, since the fixing speed under such condition is set to ½ of the speed at a regular time, the bean number is calculated as "2". Subsequently the grouping of possible beam combinations is made such that the beam group corresponding to the calculated beam number can be obtained. For example, in a case of the multi-beam composed of four beams of B1 to B4, the beam group is classified into three groups of group 1 (B1 and B2), group 2 (B2 and B3) and group 3 (B3 and B4).

At step 1605 the image forming apparatus obtains data of the profile characteristics in the multi-beam from the image forming unit 401 and obtains a curvature and a tilt of each beam from the obtained data to calculate linearity of the beam for each beam group.

At step 1606 the image forming apparatus selects one group in which the beam is the most approximate to a straight line, based upon the linearity of the beam for each beam group calculated at step 1605.

At step 1607 the image forming apparatus is dependent on the sheet setting, and sets an engine rotation mode corresponding to the number M (M is a natural number) of the beams contained in the beam group selected at step 1606. In the above example where beam group G1 in FIG. 13C is selected, since two beams (M=2) among the multi-beam of four beams (N=4) are selected, the engine rotation mode is set to a decelerating rotation mode in which the rotational speed is ½ (that is, M/N) of that in a regular rotation mode. It should be noted that similarly to a case of the first embodiment, the detail is omitted, but the setting relating to the engine rotation speed in the image forming apparatus is changed into an optimal setting by changing the engine rotation speed.

At step 1608 the image forming apparatus executes the setting for performing the image processing corresponding to the beam group selected at step 1606 to the image processing unit 402. Specifically the image forming apparatus sets the interpolation processing unit 412 in the image processing unit 402 so as to make a correction of the reverse characteristic in such a manner as to cancel out the profile of each beam in the beam group selected at step 1606 based thereon. If each beam in the selected beam group has a same curvature, the profile of each beam would be the same.

At step 1609 the image forming apparatus sets the output of the image data to be the output by the line number (beam number) of the selected beam group. Specifically the pulse width modulation 413 in the image processing unit 402 is set such that the image data are outputted from the beam in the beam group only selected at step 1606. In consequence, the multi-laser beam provided in each of the scanner units 24Y, 24M, 24C and 24K is controlled such that the exposure light is irradiated from the beam in the selected beam group only. Since the content of each processing of step 1610 to step 1614 subsequent to step 1609 is similar to that of step 1010 to step 1014 in FIG. 10 according to the second embodiment, the explanation is omitted.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-265348, filed Nov. 20, 2009, which is hereby incorporated by reference herein in its entirety.

What is claimed is:

1. An image forming apparatus comprising:
   an exposure unit configured to perform exposure by a multi-beam;
   a memory unit configured to store a profile characteristic data of each of N pieces of beams constituting the multi-beam;
   a unit configured to set a fixing speed of a color material;
   a unit configured to determine the number of the beams based upon the set fixing speed;
   a unit configured to calculate linearity of each beam based upon the curvature and tilt of each of the N pieces of the beams;
   a unit configured to select the beams of the determined number in accordance with the calculated linearity; and
   a control unit configured to control the exposure unit so as to perform the exposure using only the selected beams.

2. An image forming apparatus according to claim 1, further comprising:
   a correcting unit configured to make a correction of canceling out the profile characteristics of the selected beams.

3. An image forming apparatus according to claim 1, wherein a fixing speed of the color material is changed in accordance with a type of a sheet and in accordance with whether or not a gloss-up mode is selected.

4. An image forming method comprising the steps of:
   exposing by a multi-beam;
   setting a fixing speed of a color material;
   determining a number of the beams based upon the set fixing speed;
   reading a profile characteristic data of each of N pieces of beams constituting the multi-beam, and calculating linearity of the each beam based upon the curvature and tilt of each of the N pieces of the beams;
   selecting the beams of the determined number in accordance with the calculated linearity; and
   controlling the exposing step so as to perform the exposure using only the selected beams.

5. An image forming method according to claim 4, further comprising:
   making a correction of canceling out the profile characteristics of the selected beams.

6. An image forming method according to claim 4, wherein a fixing speed of the color material is changed in accordance with a type of a sheet and in accordance with whether or not a gloss-up mode is selected.

* * * * *